(12) United States Patent
Vantalon et al.

(10) Patent No.: US 8,490,127 B2
(45) Date of Patent: Jul. 16, 2013

(54) DISTRIBUTED TV ACCESS SYSTEM

(75) Inventors: Luc Vantalon, Los Altos, CA (US); Paolo Siccardo, Los Altos, CA (US)

(73) Assignee: Digital Keystone, Inc., Mountain View, CA (US)

( * ) Notice: Subject to any disclaimer, the term of this patent is extended or adjusted under 35 U.S.C. 154(b) by 766 days.

(21) Appl. No.: 12/338,665

(22) Filed: Dec. 18, 2008

(65) Prior Publication Data

US 2009/0172747 A1 Jul. 2, 2009

Related U.S. Application Data

(60) Provisional application No. 61/018,124, filed on Dec. 31, 2007.

(51) Int. Cl.
*H04N 7/167* (2011.01)
(52) U.S. Cl.
USPC ............................................. 725/31; 725/25
(58) Field of Classification Search
None
See application file for complete search history.

(56) References Cited

U.S. PATENT DOCUMENTS

| | | | |
|---|---|---|---|
| 6,463,585 B1 | 10/2002 | Hendricks et al. | |
| 7,861,260 B2 | 12/2010 | Shkedi | |
| 2001/0001160 A1* | 5/2001 | Shoff et al. | 725/51 |
| 2003/0139980 A1 | 7/2003 | Hamilton | |
| 2003/0149988 A1* | 8/2003 | Ellis et al. | 725/87 |
| 2003/0159151 A1 | 8/2003 | Ikeda | |
| 2004/0049694 A1* | 3/2004 | Candelore | 713/200 |
| 2005/0108746 A1* | 5/2005 | Futagami et al. | 725/31 |
| 2005/0172317 A1 | 8/2005 | Jeong et al. | |
| 2005/0229212 A1 | 10/2005 | Kuether et al. | |
| 2007/0214480 A1 | 9/2007 | Kamen | |
| 2007/0294170 A1* | 12/2007 | Vantalon et al. | 705/50 |
| 2008/0155581 A1 | 6/2008 | Leary | |
| 2008/0196056 A1 | 8/2008 | Bassett et al. | |
| 2008/0259906 A1* | 10/2008 | Shkedi | 370/352 |
| 2009/0007240 A1 | 1/2009 | Vantalon et al. | |
| 2009/0037949 A1 | 2/2009 | Birch | |
| 2009/0172726 A1* | 7/2009 | Vantalon et al. | 725/32 |

(Continued)

FOREIGN PATENT DOCUMENTS

WO   WO 01/65862 A   9/2001

OTHER PUBLICATIONS

PCT International Search Report and Written Opinion for PCT/US2008/013588 mailed Jul. 21, 2009, 22 pages.

(Continued)

*Primary Examiner* — Cai Chen
(74) *Attorney, Agent, or Firm* — Blakely, Sokoloff, Taylor & Zafman LLP

(57) ABSTRACT

Distributed navigation of broadcast signals is provided through an on-line application connected through a second network connection. A customer receives the broadcast signals through a first network connection, and navigates the broadcast TV content through an on-line application by a browser connected through a second network connection. The present on-line application provides flexible and re-configurable content services, which will need to be customized once for each service provider, but will render consistently on a variety of PC and non-PC client devices. Further, the present on-line application can provide targeted advertising by maintaining an advertising profile for each viewer, determined in part by recording data about the navigating of the content of the broadcast signals, and by recording a plurality of selections of the viewer transmitted to the on-line application. The on-line capability further provides ease for roaming access.

23 Claims, 23 Drawing Sheets

U.S. PATENT DOCUMENTS

2009/0172758 A1    7/2009    Vantalon et al.
2010/0077202 A1    3/2010    Lee et al.
2010/0135279 A1    6/2010    Petersson et al.

OTHER PUBLICATIONS

PCT Invitation to Pay Additional Fees and, Where Applicable, Protest Fee (PCT Article 17(3)(a) and Rule 40.1 and 40.2 (e)) for PCT/US2008/013588 mailed on Mar. 30, 2009, 5 pages.

European Search Report for EP 10172137 mailed Nov. 8, 2010, 6 pages.

European Search Report for EP 10172138 mailed Nov. 8, 2010, 6 pages.

Extended European Search Report for EP 10172137 mailed Sep. 29, 2010, 7 pages.

Extended European Search Report for EP 10172138 mailed Sep. 29, 2010, 7 pages.

PCT International Preliminary Report on Patentability (Chapter 1 of the Patent Cooperation Treaty) for PCT/US2008/013588 mailed Jul. 15, 2010, 14 pages.

* cited by examiner

DISTRIBUTED TV ACCESS SYSTEM

This application is related to and claims the benefit of the filing date of U.S. Provisional Patent Application No. 61/018,124, filed on Dec. 31, 2007.

FIELD OF THE INVENTION

The present invention relates to programming or other operations or services associated with broadcast signals, and in particular, at least certain embodiments relate to systems and methods for navigating, advertisement management and roaming through an on-line application.

BACKGROUND

Advancements in multimedia technology have provided television viewers a tremendous variety and range of options, ranging from broadcast over the air, sent through satellite, delivered via cable, delivered through a wireless communication system or over the Internet. For example, currently, there are over hundreds of broadcast channels offered through a cable or satellite service, together with multiple on-line Internet services.

FIG. 1 is a schematic block diagram of a conventional broadcasting system such as a cable or satellite network. The cable network includes a set top box (STB) 12 located next to a customer's display 16 or television. The STB 12 is typically a gateway device between a customer's television 16 and the broadcast communication network 10. The STB 12 receives broadcast TV content 10 from the network via cable or satellite 11, tunes to a desired channel and renders the tuned content for display on a display 16 such as a television. A local application 15 in communication with a tuner 13 and a renderer 14 receives commands from a user, for example via a remote control, to control the tuning and access the local programming guide(s), for example, viewing the TV guides. The tuner 13 can be a digital tuner or an analog tuner, configured to tune to a digital or analog channel of the broadcasting network. A remote control (not shown) can be used for operation of the STB 12 and the display 16. Additional components include a memory or storage system. The configuration shown is for purpose of illustration and is not intended to be a detailed schematic of a STB or a communication network.

Traditionally, the schedule of these programs is provided with printed TV guides or on-screen listings, which is transmitted through a dedicated cable television channel. This channel provides a scrolling programming guide where the schedules for different channels are sequentially presented. The viewer simply tunes to the dedicated schedule channel and views the program listings. But this programming guide is limited, time consuming and non-interactive.

Advanced programming guides offer interactive control where the viewer can use a remote control device to scroll the schedules through different channels and time. Furthermore, additional information regarding a selected program can also be presented, such as cast of characters or plot-line. For example, the local application in the STB may be coupled to the network to gather programming information, such as schedule information or detail information relating to specific programs. The information is typically downloaded periodically for a predetermined range of time, for example, the upcoming two weeks. The local application may include a program guide application to navigate the schedule information. However, with hundreds of different channels with many of the same events may be playing on multiple channels at different times, it is still time consuming and frustrating to surf through these programming guides.

FIG. 2 presents a schematic block diagram of a cable or satellite network where the STB is divided into a bridge component 27 and a PC or STB component 22, linked together by a secured interface 28. The division typically gives the tuner 23 to the bridge component 27 and the renderer 24 to the PC or STB component 22. A bridge application 28 within the bridge component 27 controls the tuner 23, and a local application 25 within the PC or STB component 22 controls the renderer 24 and communicates with the bridge application 28. To protect the broadcast TV content 20, data transmission from the bridge component 27 to the PC or STB component 22 is secured through a secured interface 28, such as a Digital Right management (DRM) or a conditional access (CA) system. The conditional access system restricts channels accessible by the device to authorized channels only. The TV content can be encrypted with an access code to limit access in some manner defined by the content provider or the network, for example, the content may be playable for 3 times following payment. Even though a PC can be used in place of STB, the program guide application which resides in the PC is still restricted to the local application, and does not take advantage of the numerous navigation options available in a modern PC.

Advances in telecommunications and computing technology are leading to interactive television, providing video gateways and transport to residential and business subscribers. Interactive TV service is capable of supporting traditional television programming and other video services such as pay-per-view (PPV) and video-on-demand (VOD). Furthermore, with the increase in Internet connection speeds, traditional television content, in additional to Internet-only television content, can be delivered over the Internet.

The basic difference between broadcast TV and Internet-based TV is in the most typical case the location of content selection, or tuner. In a broadcast TV or satellite network, the network sends all broadcast content (e.g. a plurality of broadcast channels) downstream to every customer, and the customer selects or tunes to the desired content at the STB. In most implementations of an Internet-based TV service, the customer sends the selection upstream to the network, and the network selects and then sends only the selected content to the customer's home.

IPTV (Internet Protocol Television) is a system where a digital television service is delivered by using Internet Protocol over a network, such as a broadband connection. For residential users, IPTV is often provided in conjunction with Video on Demand and may be bundled with other Internet services.

FIG. 3 illustrates a schematic block diagram of an IPTV network communication. The TV content 30 is controlled by an IPTV server 38, including live TV or stored video such as VOD, and can be sent through IP Multicast in which information can be sent to multiple computers at the same time, or through IP Unicast in which information is sent to a specific computer through a point-to-point unicast connection between the PC or STB and the delivering server. An application 37 selects the content to be sent, and delivers the selected content 33 through the Internet 31 to the customer. After receiving the information through the Internet 31, a PC or STB 32 renders the content through a renderer 34 to a display 36. Since the information is pre-selected, there is no tuner necessary. A local application 35 can be included for interactive communication with the network, providing channel surfing and transmitting requests of program selection to the server. An Internet-based platform can provide a more interactive and personalized TV viewing experience. The viewer can search the Internet for any desired information, such as content by title or actor's name, thus allowing them to surf TV programs more effectively. However, currently, real-time data transmission with the Internet Protocol has restricted the growth of the Internet infrastructure in comparison to broadcast TV of cable or satellite TV systems that scale much better.

Another form of TV content delivered through Internet is Internet television, where the content is designed specifically for an Internet audience. Internet Television is available from the Internet, and can be accessible by a PC without the need for a STB. FIG. 4 illustrates a schematic block diagram of an Internet TV network communication where a viewer accesses a browser 49 from a PC 42, communicates through the Internet 41 with an application 47 of a server 48 for a selection of TV content 43. The selected TV content 43 is then sent through the Internet 41 to the PC 42, rendered to a desired format by a renderer 44, and displayed on a display 46.

There are different ways to deliver TV content over an IP network. The distinction between IPTV and Internet TV consists of the access method. In the case of IPTV a local network provider—specific application performs content navigation, while in the case of Internet TV a standards-based browser is used to navigate the content. In both cases the service delivers video content to a viewer's TV through an Internet connection.

The availability of these different delivery mediums has resulted in broad programming choices available to the consumer, including broadcast programs, movies, Pay-Per-View (PPV), and video on demand (VOD).

Advances in Internet communication has also provided Internet-based communication linked with broadcast TV content. For example, a TiVo recording service allows users to capture television programming to an internal hard disk storage. The TiVo application resides locally in the STB with the data updated periodically from a server, for example, through a telephone line or through the Internet. TiVo also provides an electronic television programming schedule, and permits the setting of recording options based on that schedule information. TiVo devices can also be connected to the Internet for downloading information and even video programs and movies from the Internet.

FIG. 5 illustrates an exemplary TiVo network connection. A STB 52 with a TiVo application 55 can allow the viewer to select programs delivered from broadcast TV content 50, sent through cable or satellite network 51. The selection controls the tuner to tune the broadcast signals to the desired channel. TiVo application 55 allows the viewer to select a program to watch or to record now or later. The TiVo application is similar to a local application, with a predetermined program and updated data downloaded from the network.

In addition, the TiVo application also provides communication capability to a remote computer 59, operating a browser linked with the Internet 53 to access a program on a server 58, for example, TiVo.com or other supplemental applications. This capability allows the remote server to surf the Internet, and then select a desired program to be recorded. The application from the server then sends instruction through the Internet to the TiVo application, setting the recording parameters so that the STB can record the desired program.

Another TV system which uses the Internet is a Slingbox. A Slingbox is a TV streaming device that sends video from their cable, satellite, or personal video recorder (DVR) to an Internet network to be viewed on a remote display. FIG. 6 illustrates a Slingbox connection where a Slingbox client 64 connects a TV source 68 to an existing Internet connection 63. A Slingbox server 65 connects a remote display 69 to the Internet 63, and the Slingboxes 64, 65 direct the video from the broadcast TV content 60 to the Internet 63 and to the remote display 69. The DVR and STB can also be controlled by a remote control at the remote location.

SUMMARY OF THE DESCRIPTION

Embodiments of the present invention disclose an on-line application for navigating broadcast signals provided by a network such as cable or satellite. A customer receives the broadcast signals through a first network connection, and navigates the broadcast TV content through an on-line application connected through a second network connection. The first network connection and the second network connection may be two connections on the same network (e.g. two connections through two different software ports) or two connections on two different networks (e.g., the Internet and a private TV network such as a cable of satellite TV network).

In exemplary embodiments, a client receives the broadcast signals, through a first network connection, and is also connected to an on-line application executed on a server through a second network. The client then can navigate the content of the broadcast signals using the on-line application through a browser such as an Internet or worldwide web browser. This browser may be full featured or less than full featured browser.

In exemplary embodiments, the on-line application receives requests from the browser and responds to these requests. In response to the requests from the browser, the on-line application can transmit data from the server to the browser, comprising representations of an instruction to control a tuner such as a tuner in a system executing or coupled to the browser.

The present on-line application provides flexible and re-configurable content services, which will need to be customized once for each service provider, but will render consistently on a variety of PC and non-PC client devices, for example, through a browser and some operating system-specific plug-in. Using a platform-specific content browser and protected player, the user can experience a fully customized, seamless set of content services, without a single line of service-specific code on a PC (windows operating system) or MAC.

In exemplary embodiments, the present on-line application provides an on-line advertisement management, which can maintain an advertising profile for each viewer of a plurality of different viewers, which is determined in part by recording data about the viewer's navigating of the content of the broadcast signals, and by recording a plurality of selections (e.g., selection of content to use or view) of the viewer transmitted to the on-line application.

The on-line application or an application associated with the on-line application first determines an advertisement profile for the user of the browser, and then causes the substituting of the incoming advertising from the broadcast signals with advertisements selected based on the advertising profile. Alternatively, the client receives the broadcast signals from the network, and identifies the incoming advertising. Based on the advertising profile, the profile advertisements are selected to substitute the incoming advertising.

The present advertising profile can accurately and automatically determine the personal preferences of a viewer, and thus advertisements based on the profile advertising can be presented to the viewer with high degree of match for the personal TV viewing environment.

In exemplary embodiments, the present on-line application provides roaming capability for navigating broadcast signals. With the on-line application executing and residing remotely, such as in a server connected to the Internet, and the gateway is a generic browser, a remote roaming computer or other consumer electronic system can be linked to the Internet and navigate the on-line application using a browser of the remote computer. Seamless operations can be achieved with pertinent data parameters stored in the server. The remote roaming computer can be linked by a local network, such as in a location across the room of the television display. The remote computer can be linked across town, or across country, and still be connected and controlling the navigating broadcast signals. The connection can be wired or wireless connection. In one embodiment, a method to receive content in a roaming fashion is provided by a system which includes a roaming client system (such as a personal computer or other consumer electronic systems which may or may not be portable but typically is portable) and a first client system (such as a personal computer or set-top box or other consumer electronic systems). The roaming client system may include a software component such as a browser (e.g. an Internet browser such as Microsoft's Internet Explorer) which can be used to connect to an on-line application for content navigation and for registration of the roaming client system. In one embodiment, the method includes registering the browser of the roaming client system, through a second network connection, to the on-line application and enabling the exchange of DRM credentials for use/viewing of content and receiving commands for navigating, through the browser, of available broadcast content of broadcast signals. The navigating is typically performed by receiving commands, from a user operating the browser, and those commands are sent to the on-line application which interprets those commands and provides a response such as an instruction to cause a tuner to tune to the selected content. The user may move or flip through several screens of listing or directories or other presentations of the available broadcast content, and this may be one form of navigating through the content in order to select or use the content. The browser may receive a selection or command from the user and this selection or command may specify a URL, associated with the selected content, which is transmitted to the on-line application. The on-line application receives the transmitted URI and determines an associated command or data message, which may specify or be associated with the selected content. The command or data message determined by the on-line application can be used to provide or create any required DRM credentials to allow the roaming client system to use or view the desired content.

The desired content may be provided to the roaming client system in any one of several different ways. The desired content may be sent through a first network connection (which provide the desired content to one or both of the roaming client system and the first client system); in this case, the first client system may receive the desired content through the first network connection and also provide the desired content to the roaming client system. In another case, the desired content may be received by the roaming client system from a remote broadcast connection (e.g. a broadcast tuner on the roaming client system which receives over the air broadcasts), and the desired content can be played back at the roaming client system upon activation through an interaction between the browser at the roaming client system and the on-line application. In yet another case, the desired content may be stored on a storage device in or coupled to the roaming client system and can be played back upon activation through an interaction between the browser at the roaming client system and the on-line application. In yet another case, a copy of the desired content may be sent from the on-line application to the roaming client system.

DETAILED DESCRIPTION

The present invention relates to navigating broadcast signals through an on-line application that seamlessly connects to a local receiver in addition to optionally providing in at least certain embodiments advertising management and roaming capabilities.

The present invention may also be embodied in a machine or computer readable format, e.g., an appropriately programmed computer, a software program written in any of a variety of programming languages. The software program would be written to carry out various functional operations of the present invention. Moreover, a machine or computer readable format of the present invention may be embodied in a variety of program storage devices, such as a diskette, a hard disk, a CD, a DVD, a nonvolatile electronic memory, or the like. The software program may be run on a variety of devices, e.g. a processor which is part of a consumer electronic device, such as a computer system, a set-top box, an entertainment system or PDA or cellular telephone.

Figure 1:
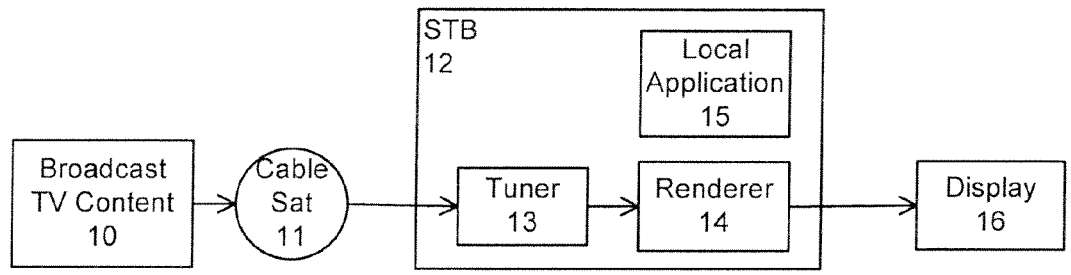
FIG. 1 illustrates a schematic block diagram of a conventional broadcasting network.
Figure 2:
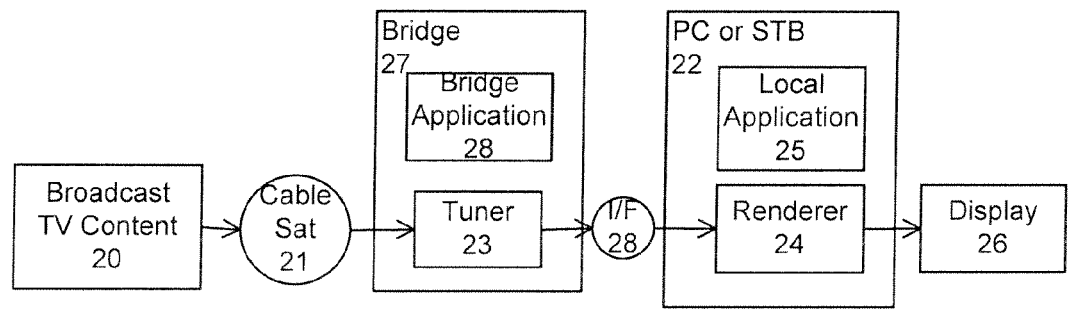
FIG. 2 presents another schematic block diagram of a cable or satellite network.
Figure 3:
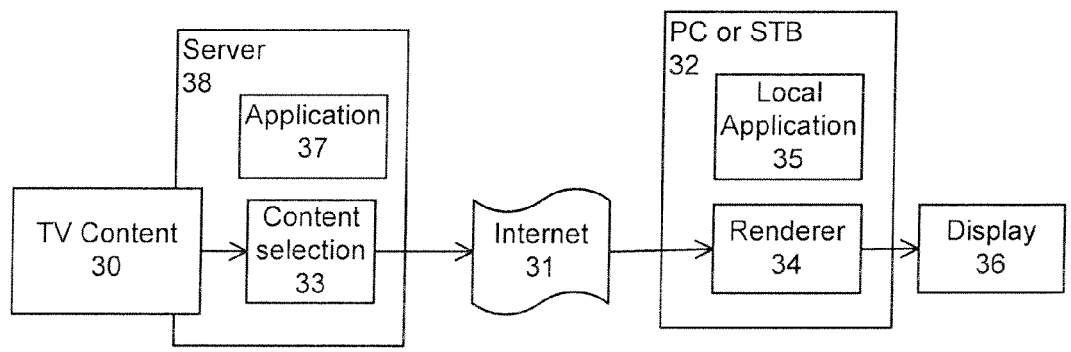
FIG. 3 illustrates a schematic block diagram of an IPTV network communication.
Figure 4:
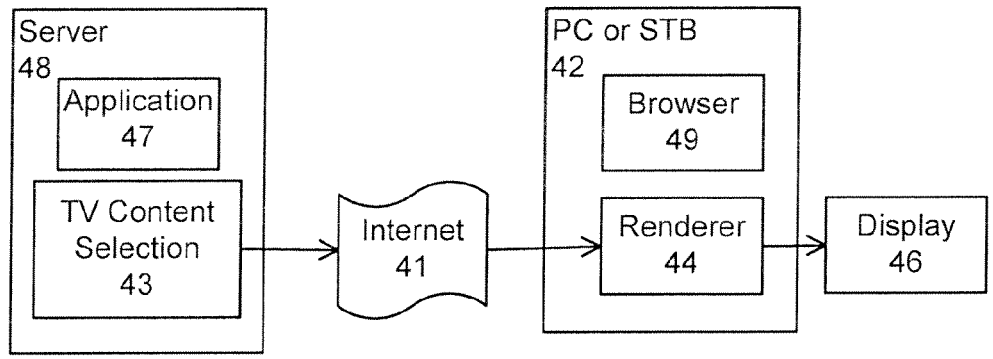
FIG. 4 illustrates a schematic block diagram of an Internet TV network communication.
Figure 5:
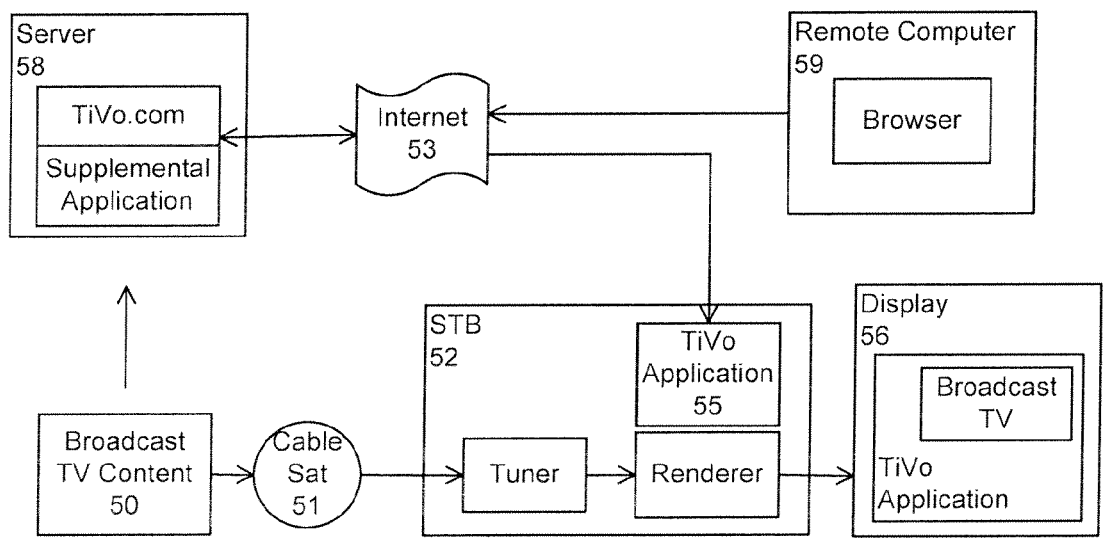
FIG. 5 illustrates an exemplary TiVo network connection.
Figure 6:
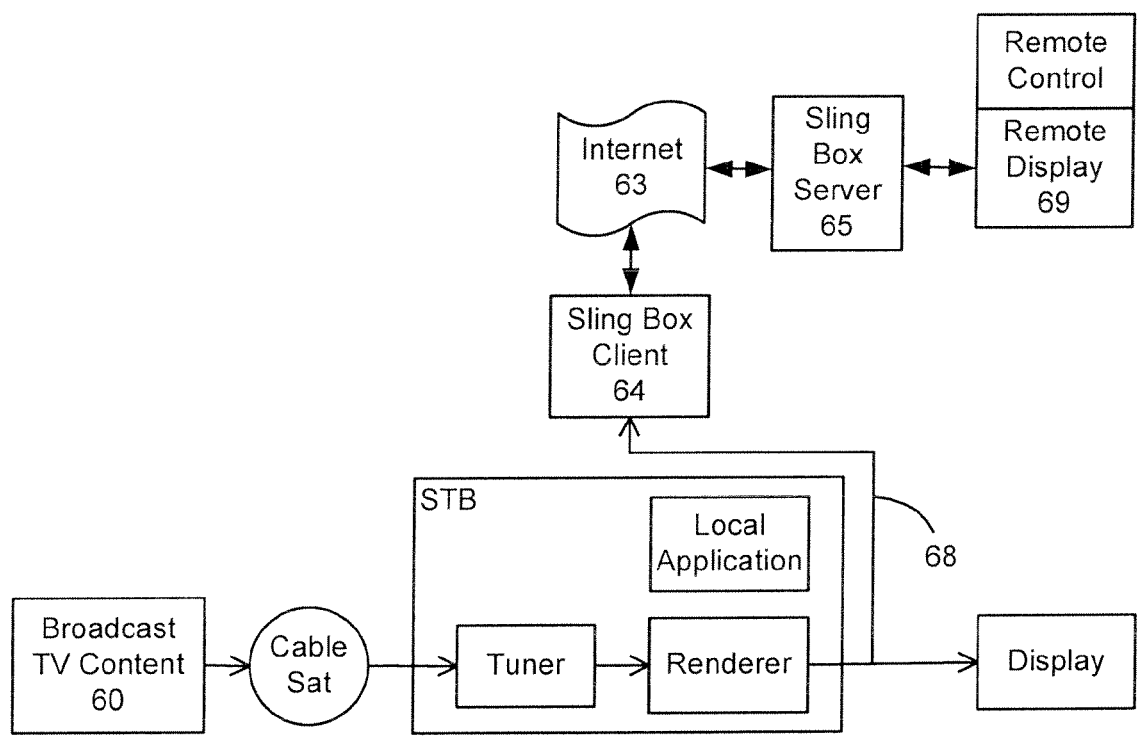
FIG. 6 illustrates an exemplary Slingbox connection.
Figure 7:
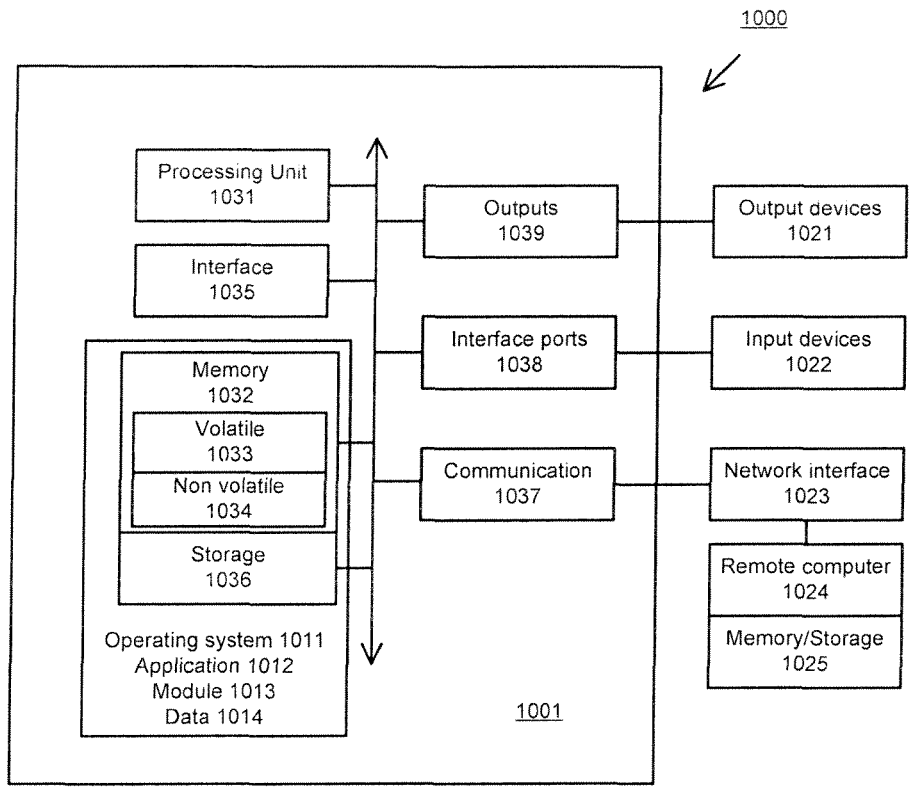
FIG. 7 illustrates an exemplary computer system which can be used in at least certain embodiments of the present invention.

With reference to FIG. 7, an exemplary environment 1000 for implementing various aspects of the invention includes a computer 1001, comprising a processing unit 1031, a system memory 1032, and a system bus 1030. The processing unit 1031 can be any of various available processors, such as single microprocessor, or dual microprocessors or other multiprocessor architectures. The system bus 1030 can be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card Intenational Association bus (PCMCIA), or Small Computer Systems Interface (SCST).

The system memory 1032 can include volatile memory 333 and nonvolatile memory 1034. Nonvolatile memory 1034 can include read only memory (ROM), programmable ROM (PROM), electrically programmable ROM (EPROM), electrically erasable ROM (EEPROM), or flash memory, Volatile memory 1033, can include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

Computer 1001 also includes storage media 1036, such as removable/nonremovable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk drive (DVD drive). A removable or non-removable interface 1035 can be used to facilitate connection.

The computer system 1001 further can include software to operate in environment 1000, such as an operating system 1011, system applications 1012, program modules 1013 and program data 1014, which are stored either in system memory 1032 or on disk storage 1036. Various operating systems or combinations of operating systems can be used.

Input devices 1022 can be used to enter commands or data, and can include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 1038. Interface ports 1038 can include a serial port, a parallel port, a game port, a universal serial bus (USB), and a 1394 bus. The interface ports 1038 can also accommodate output devices 1021. For example, a USB port may be used to provide input to computer 1001 and to output information from computer 1001 to an output device 1021. Output adapter 1039, such as video or sound cards, is provided to connect to some output devices such as monitors, speakers, and printers.

Computer 1001 can operate in a networked environment with remote computers 1024. The remote computers 1024, shown with a memory storage device 1025, can be a personal computer, a server, a router, a network PC, a workstation, a microprocessor based appliance, a peer device or other common network node and the like, and typically includes many or all of the elements described relative to computer 1001. Remote computers 1024 can be connected to computer 1001 through a network interface 1023 and communication connection 1037, with wire or wireless connections. Network interface 1023 can be communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 8:
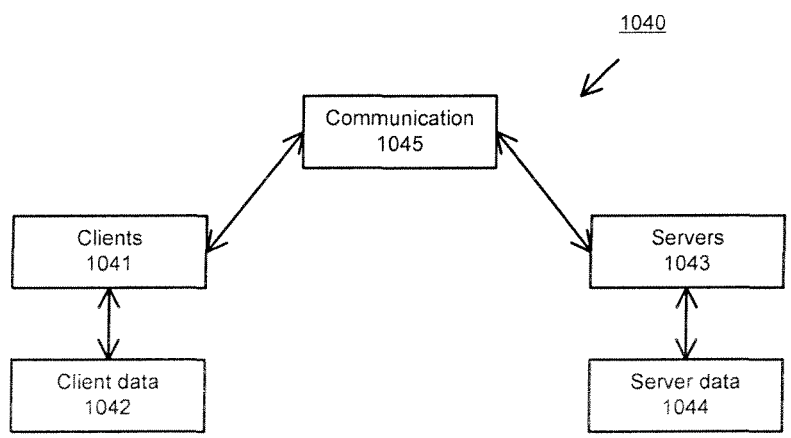
FIG. 8 illustrates a schematic block diagram of a sample computing environment.

FIG. 8 is a schematic block diagram of a sample computing environment 1040 with which the present invention can interact. The system 1040 includes a plurality of client systems 1041. The system 1040 also includes a plurality of servers 1043. The servers 1043 can be used to employ one or more embodiments of the present invention. The system 1040 includes a communication network 1045 to facilitate communications between the clients 1041 and the servers 1043. Client data storage 1042, connected to client system 1041, can store information locally. Similarly, the server 1043 can include server data storages 1044.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

Embodiments of the present invention comprise an on-line application which provides navigation of network broadcast signals. The on-line application and the broadcast signals are preferably connected through two network connections where a customer receives the broadcast signals through a first network connection (e.g. a cable TV's network) and navigates the content of the broadcast signals through an on-line application connected through a second network connection (e.g. the public Internet).

Figure 9:
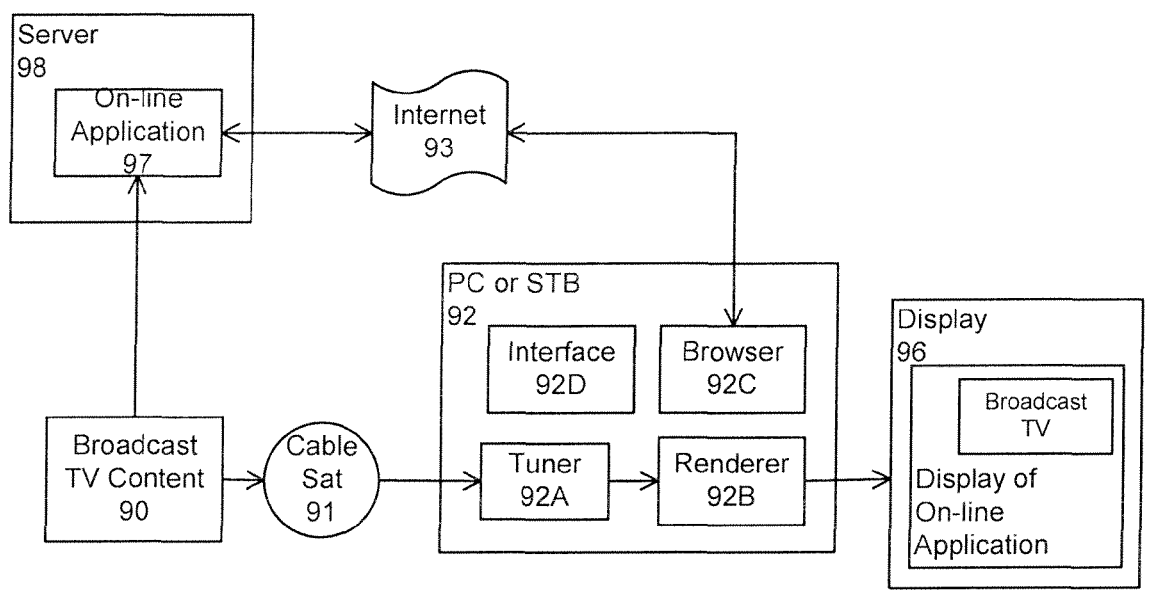
FIG. 9 illustrates an exemplary system according to one embodiment of the present invention.

Shown in FIG. 9 is an exemplary system according to the present invention comprising a PC or STB 92 receiving broadcast signals 90 through a first network 91, such as a cable or satellite network for displaying on a display 96, or for recording on a DVR (not shown). The received broadcast signals typically comprise multiple frequencies of multiple signals in multiple channels. The PC or STB 92 includes a tuner 92A for tuning the broadcast signals to at least one frequency of signals to detect and receive a desired content in one channel from the broadcast signals. The PC or STB also includes a renderer 9213 for rendering the desired content to a desired format for viewing or storing, including content and access protection. The PC or STB further includes a browser 92C capable of controlling the tuner 92A and the renderer 92B, for example, through an interface 92D or a plug-in. The browser 92C is connected, at least when needed, to an on-line application 97 executing on a server 98 through a second network connection 93, for example, the Internet, and communicating with an on-line application 97 for navigating the broadcast signals 90. The PC or STB 92 can further include IO devices (not shown) such as a keyboard, a mouse or any pointing devices.

In exemplary embodiments, a client receives the broadcast signals, through a first network connection such as a cable or satellite network, to a PC or STB and then directs them to a display or a recording medium. The client is also connected to an on-line application executing on a server through a second network such as the Internet. The connection is preferably through a browser (such as a web browser which may be full featured or less than full featured) operating within the PC or STB. The client then can navigate the content of the broadcast signals using the on-line application through the browser. The navigating process can be performed with standard IO devices, such as keyboard, mouse, or any pointing device, and a display. In response to the navigation, the tuner is tuned to a selected channel and a particular program is rendered to a desired format either for viewing on a display or for storing on a recording device.

Figure 10:
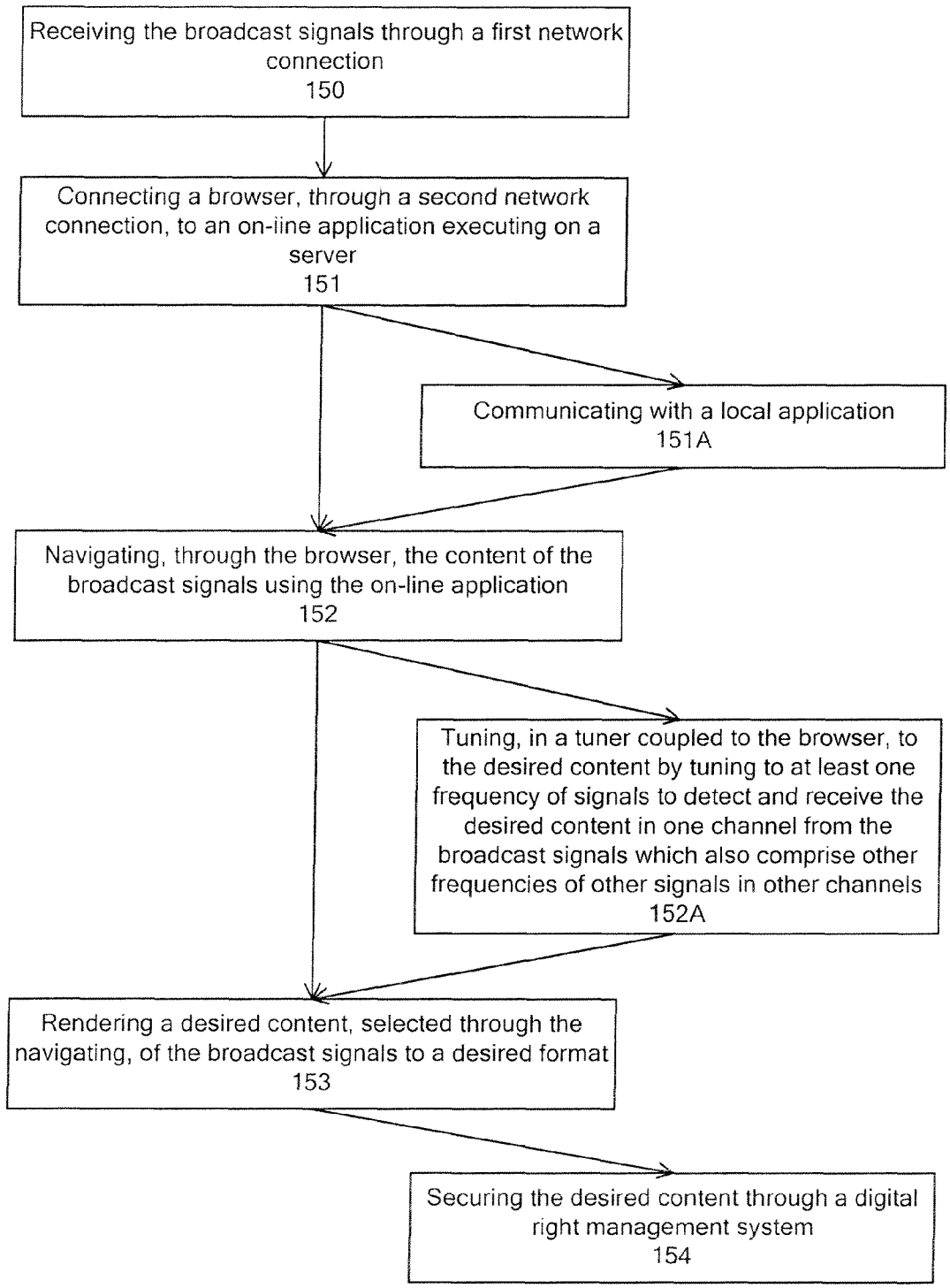
FIG. 10 illustrates an exemplary flowchart for embodiments of the present invention.

FIG. 10 illustrates an exemplary flowchart for certain embodiments of the present invention. Operation 150 provides that broadcast signals are received through a network connection, such as a cable or a satellite network. The broadcast signals comprise multiple frequencies of multiple signals in multiple channels sent to the client system. In operation 151, a browser is connected through a second network connection, such as the Internet, to an on-line application executing on a server. Optionally, the browser can also communicate with a local application such as a recorder controller, in operation 151A. In operation 152, the content of the broadcast signals are navigated through the browser using the on-line application. In response to the navigating commands, information and instructions are received from the on-line application, for example, results from a query request for a movie search, or a tuning instruction to tune a tuner coupled to the browser to a desired content (operation 152A). The tuning process comprises tuning to at least one frequency of signal to detect and receive the desired content in one channel from the broadcast signals. After tuning the tuner to the desired channel, operation 153 provides that the desired content of the broadcast signals, selected through the navigating, is rendered to a desired format with the desired content secured through a digital rights management system (operation 154). The desired format can be recorded to a DVR or displayed in a display.

In exemplary embodiments, the on-line application receives requests from the browser and responds to these requests. These requests can be for browsing or for selecting the content of the broadcast signals. For example, browsing the content of the broadcast signals includes looking for the showing time of a particular movie, or looking for movies performed by a particular actor. Selections made by a user of the browser may often cause a URL, or a portion of a URL, associated with the selection to be sent to the on-line application which can in turn respond with data specifying instructions for tuning the tuner at the client system. Selecting the content of the broadcast signals can include selecting a movie for recording, or a channel to view. In response to the requests from the browser, the on-line application can transmit data from the server to the browser. The transmitted data can comprise programming guides, programming schedule, detailed information regarding specific programs, or a search result in response to an inquiry. The transmitted data can also comprise a representation of an instruction to tune the tuner at the client system to at least one channel of the content of the broadcast signals. The instruction can also direct the renderer to render the selected content to a desired format for viewing or for recording.

Figure 11:
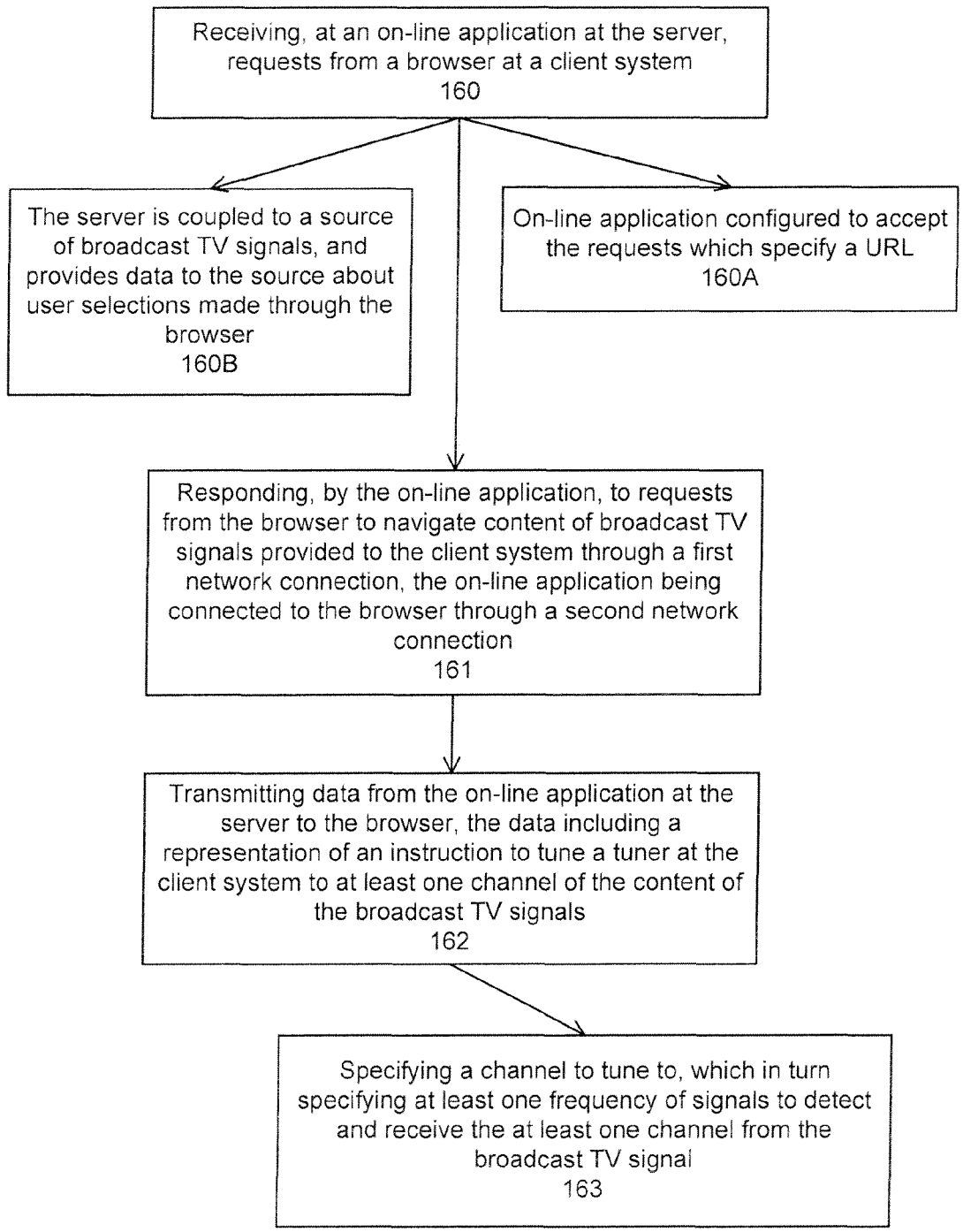
FIG. 11 illustrates another exemplary flowchart for embodiments of the present invention.

FIG. 11 illustrates another exemplary flowchart for embodiments of the present invention. In operation 160, the on-line application at a server receives requests from a browser at a client system. The on-line application is configured to accept requests that contain parameters encoded according to a number of methods including embedding the parameters in the on-line server URL (operation 160A). The server may be coupled to a source of broadcast signals, may provide data to the source about the user selection made through the browser (operation 160B). In operation 161, the on-line application responds to the requests from the browser to navigate the content of the broadcast signals. The broadcast signals are provided to the client system through a first network connection such as a cable or satellite network. The browser is connected to the on-line application through a second network connection such as the Internet. In operation 162, data is transmitted from the on-line application at the server to the browser. The data includes in a least certain embodiments a representation of an instruction to tune a tuner at the client system to at least one channel of the content of the broadcast TV signals. The instruction can specify a channel to tune to, which in turn specifies at least one frequency of signals to detect and receive the at least one channel from the broadcast TV signals (operation 163).

Figure 12:
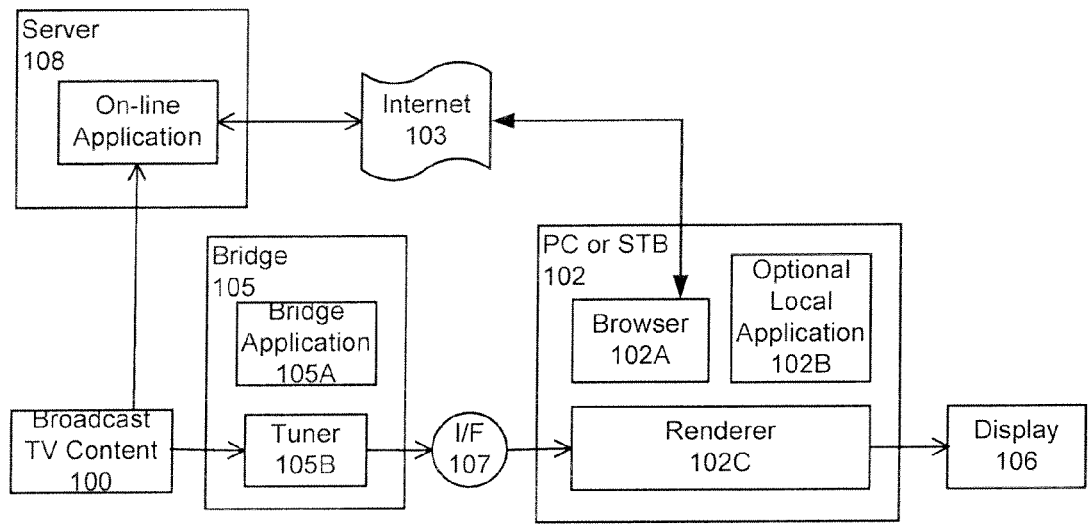
FIG. 12 illustrates an exemplary block diagram of certain embodiments of the present invention where the PC or STB is split to include a Bridge.

FIG. 12 illustrates an exemplary block diagram of the present invention where the PC or STB 102 includes a Bridge 105. The tuner 105B in this embodiment resides in the Bridge portion 105 and the renderer 102C is in the PC or STB portion 102. A bridge application 105A controls the tuner 105B for tuning the broadcast signals 100. The bridge application 105A communicates and can be controlled by the browser 102A from the PC or STB 102, which can optionally include local application 102B, and renderer 102C for rendering the content to a display 106 or a recorder (not shown). The browser 02A communicates with an on-line application executing on server 108 through Internet connection 103. Security measures include protecting Interface 107 to ensure that the signals are not transmitted in naked form, which can easily be compromised. Access control can reside in bridge application 105A, requiring using content protection and protocol to re-encrypt the signals passing from the tuner 105B to the renderer 102C. The renderer 102C can comprise access code for decoding the encrypted signals for viewing. Portions of the access control can reside in the on-line application, which controls the browser 102A and bridge application 105A.

Figure 13:
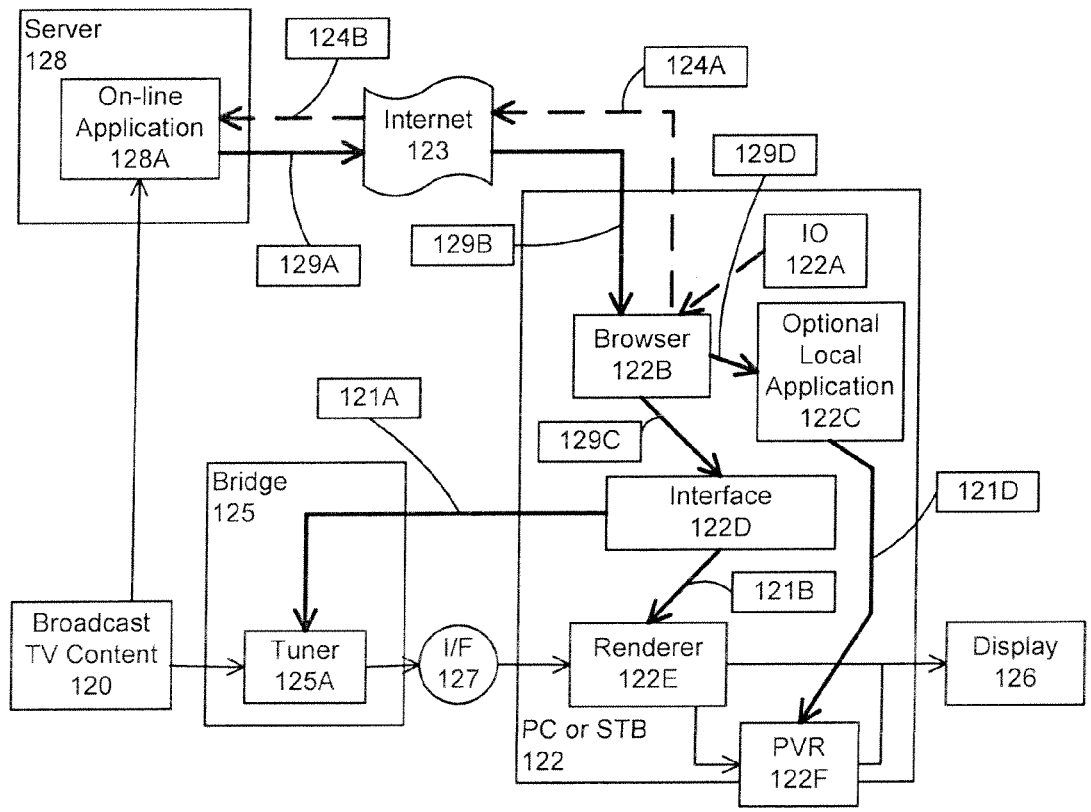
FIG. 13 illustrates exemplary interactions between a client system and an on-line application.

FIG. 13 illustrates exemplary interactions between a client system (display 126, STB 122, and bridge 125 together with a secured interface 127) with the broadcast TV content 120 and the server 128 through a broadcast network connection and an Internet connection 123. The bridge 125 comprises a tuner 125A and optional bridge application (not shown). The STB 122 comprises an interface or plug-in 122D, controlling the renderer 122E, the DVR 122F and possibly the tuner 125A, preferably through the bridge application. The STB 122 further comprises a browser 122B controlling the interface 122D, and in communication with local application 122C, for example, to control the DVR 122F. The browser can receive input from IO devices such as a keyboard and a mouse for interfacing with the user.

A user can use the IO devices interfacing with the browser 122B to send navigating commands or requests 124A to the Internet network and 124B to the on-line application 128A executing on server 128. The commands typically include "click", e.g. selection of commands or icons displayed of the on-line application displayed on a display device. The commands can include alphanumeric commands, e.g. a search string for a particular program. Receiving the command 124B, the on-line application sends back information or instructions (or representations of information and instructions), optionally after consulting with a broadcast station. Representation 129A is sent through the Internet arrives at browser 122B. Browser 122B digests the representation 129B and sends appropriate commands to appropriate devices or applications. For example, for an information representation, browser 122B routes the representation to an IO device, such as the display for displaying the information. For a recording representation, the browser 122*b* routes the representation 129D to the local application 122C which send controls commands 121D to the recording device DVR 122F. For a tuning representation, the browser routes the representation 121A to the tuner 125A, through the bridge 125 or a bridge application. The browser can also route the representation 121B to the renderer 122E for rendering the content from the tuner.

In exemplary embodiments, the present invention discloses systems and methods for navigating broadcast signals received through a first network connection with the navigation control shifted to an on-line application executed on a server, connected through a second network connection. The on-line application is preferably connected to a browser residing in a PC or STB with hardware and operating system-specific plug-ins, which can communicate with the peripheral drivers such as the tuner, the remote control, the display or other devices or performs the task of securely rendering (protected player) and recording (DVR). Browsing the broadcast content, the broadcast schedules, the detailed information regarding a specific program, or any other information can be performed using the on-line application, which can be any application on the Internet, for example, a search engine for locating the play time of a movie or for locating a similar preference, or a website of the service provider.

In exemplary embodiments, the present invention discloses systems and methods for navigating broadcast signals where the control is shifted to an on-line application. With the on-line application residing in a server, connected to the browser through an Internet connection, the platform and the programming can be hardware and operating system independent, for example, a same on-line application can be used for a browser running on a PC or a non-PC (wireless phone, TV, etc.). Programming can be simplified, since coding can be accomplished using Internet programming (e.g. Java), and not conventional programming languages. Different hardware associated with different platforms can be accommodated with hardware-specific plug-ins or drivers.

The present on-line application provides flexible and re-configurable content services, which will need to be customized once for each service provider, but will render consistently on a variety of PC and non-PC client devices, for example, through a generic browser and hardware and operating system-specific plug-in. Using a platform-specific content browser and protected player, the user can experience a fully customized, seamless set of content services, without a single line of service-specific code on the PC or MAC.

In exemplary embodiments, when a bridge device is capable of supporting multiple security systems and protocols, the present on-line application will select the best combination based on the hardware and operating system capability of the STB or PC. For example, the bridge may protect the content with DTCP as controlled by DLNA when connected to a Mac while it can protect the content with WMDRM as controlled by PBDA when connected to a Windows PC.

The better processing capability of digital media is, however, also one of the downsides of using digital media. For example, digital media, or more precisely digital data associated with digital media, can be reproduced indefinitely without any loss of quality, often with no or very little cost. Furthermore, it can be easily altered or modified or copied in part or in whole without any accountability. This has been a hindrance to wide-scale adoption of digital media in many potential application areas. This is especially true for copyrighted media, or media that otherwise need to be protected for transmission, access, or reproduction. In many cases, the user needs special rights or permissions in order to be able to perform certain tasks or operations associated with a digital media. This is often referred as digital rights. The term digital rights sometimes refers to legal rights associated with the digital media. It sometimes refers to technical rights or capabilities, and it may not necessarily coincide with the rights holder's legal rights.

A digital rights management (DRM) system manages digital rights and also rights of other types of media. Many digital media publishers and vendors use DRM systems to protect copyrighted or otherwise access-controlled materials. Typical DRM systems use various technical measures to identify, describe, analyze, valuate, trade, monitor, and track digital rights. For example, DRM systems often use copy protection measures to control and/or restrict the use and access of digital media content. In the commercial context, DRM provides a method to control any duplication and dissemination of digital media so that appropriate fees can be collected, for example, for each copy or for each performance of the media content.

A typical DRM system uses encryption and decryption software for this purpose along with other software or hardware based security measures. For example, DVD movies are encrypted, or scrambled, using Content Scrambling System (CSS) by DVD Forum. The data on the DVD is encrypted, in addition to being compressed or encoded in MPEG-2 format, and it may only be decrypted and viewed using one or more valid decryption keys. In a typical DRM scheme, a DRM server wraps the digital content through encryption according to applicable policies.

Once the digital media is delivered, a DRM client unwraps the content and makes it accessible to the user in accordance with his or her rights. DRM clients may include desktop PCs, handhold devices, set-top boxes, mobile phones and other portable devices as well as other dedicated digital media players (e.g., for music, movies, etc.) and television and radio sets. The digital rights are typically distributed to clients separately from the wrapped media content. They can be distributed at the time of the content distribution, or they can be dynamically accessed later when needed, for example, at the time of storage or playback.

In the cable industry, and in other related industries such as satellite broadcasting, media is protected by conditional access (CA) systems. CA refers to a technique for limiting the access of protected content to authorized users. In a typical CA system such as those used in the cable television industry, the scrambled media content is delivered along with a decryption key called a control word (CW). The control word is embedded in an encrypted message called ECM (entitlement control message), which can be decrypted using another key called a service key (SK). The service key is delivered to the user in a different message called EMM (entitlement management message), and it may be unlocked using a user-specific decryption key, or user key (UK), which is typically associated with a client device, either at hardware or firmware level, such as a "smartcard". The lifetime of each key varies depending on the purpose, and it varies from application to application. Typically, the lifetime of CW is much shorter (on the order of 0.1 second for live video stream) than that of SK, which is, for example, on the order of a month or so for a subscription channel in the cable television. SK and CW can also be associated with a particular media, for example, a movie title for pay-per-view. The UK is usually permanent, but can be replaced by providing a new smartcard to the user. Typical CA systems also have the ability to "revoke" UKs from unauthorized devices. It should be noted that a CW is not generally user specific. Using the (subscriber-specific) SK, the system can securely broadcast other common information, such as the CWs or the media content, to subscribers simultaneously without having to broadcast a different program for each of the subscribers.

The digital media content (e.g., video and audio signals) of one program, typically in the MPEG-2 or H264 format in the case of cable and satellite television, is sometimes multiplexed together with those of other programs for transmission so that multiple programs appear to be transmitted simultaneously. A CA system scrambles the digital form of programs and transmits the entitlement control messages and the entitlement management messages with the digital form of programs for broadcast either within the multiplex (e.g., for satellite) or through an out-of-band channel (e.g., for cable).

Content encryption is typically done using symmetric key cryptography, while key encryption is typically done using public key/private key cryptography. In symmetric key cryptography the same or essentially equivalent keys are used to both encrypt and decrypt the data. In the asymmetric or public key cryptography, different but related keys are used to encrypt and decrypt the data. Public keys may be derived from the corresponding private keys in certain cryptographic schemes, but not vice versa. In general, encryption/decryption schemes based on symmetric key cryptography are less expensive than those using asymmetric key cryptography in terms of computational requirements.

Typically, a client device such as a set-top box (STB) at the receiving end descrambles the data stream and decodes the MPEG-2 data for viewing. A tuner portion of the STB receives the incoming signal, demodulates it and reconstitutes the transport stream, which contains multiple packets of information. The set-top box can de-multiplex the entitlement management messages and entitlement control messages and the media content. The data (e.g., service key and control word) contained in the entitlement management message and entitlement control message are used to descramble the encrypted programming content. The set-top box then decodes the MPEG-2 data and renders the content for viewing.

Some DRM systems can generate a short-lived license with limited rights at capture time, with the option to upgrade to a permanent license with more rights later. In this mode, ready access to CA servers may be required to revisit the original instruction that led to the original DRM license.

Figure 14:
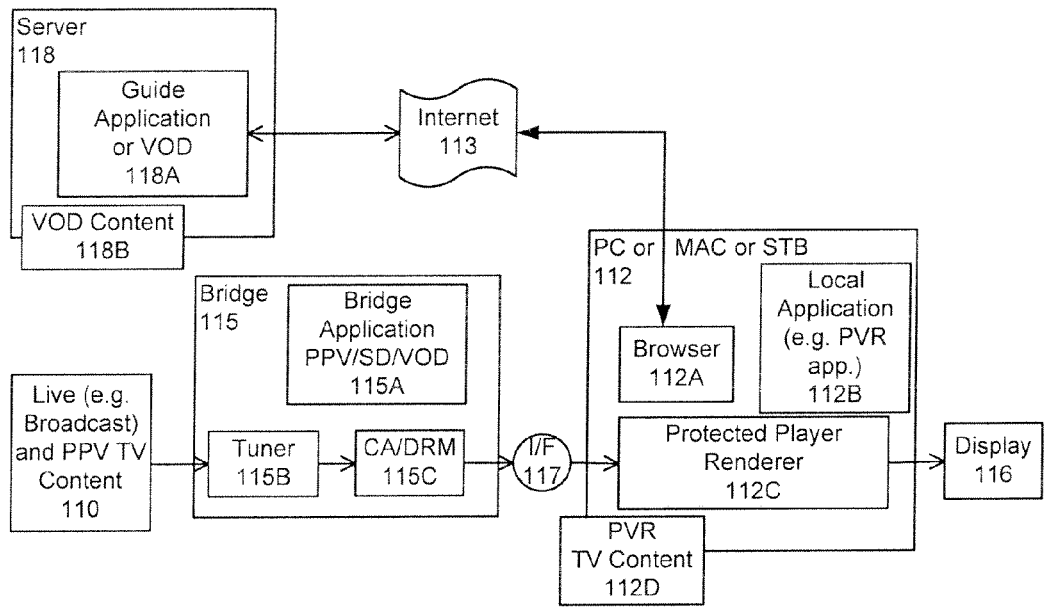
FIG. 14 illustrates another exemplary embodiment of a system for playing back protected content using an on-line application.

FIG. 14 illustrates another exemplary embodiment of protected content using the present on-line application. Broadcast signals 110, including live and PPV TV content, are sent to bridge 115 through the tuner 115B and an exemplary CA/DRM protection device 115C which acts as the bridge between a first DRM domain provided by the cable or satellite TV provider and a second DRM domain. The signals then pass to the renderer 112C of the PC or MAC or STB 112 before reaching the display 116. Interface control 117 can be included to protect the content when passing between the bridge 115 and the STFB 112. Content navigating is accomplished by the on-line application 118A executing in a server 118, through the Internet connection 113. The on-line application 118 can host the pay TV service application such as the guide application, PPV application or VOD application and can host other services for TV content or other content such as web pages, etc. Content of VOD 118B can be controlled and sent from the server 118 through the Internet connection 113 to the renderer 112C, preferably a protected player renderer for security reason and to the display 116. Pay TV content 110, such as live or PPV can be controlled and sent from the broadcast signal to the tuner and accessed by the CA/DRM access device 115C. Bridge application 115A can provide access control features that facilitate service access for PPV, Switched Digital (SD) and VOD applications. Browser 112A communicates with on-line application 118A, and also with bridge application 115A and local application 112B, for example, to control a DVR device for recording protected content.

Secured or conditional access can be in various formats. For example, certain related CA servers may be used for various DRM purposes such as authenticating clients. DRM systems may also manage the digital rights associated with digital media through other methods. The CA server typically resides across a network from a client device, such as cable network, satellite network, wireless phone network, or the Internet. When a digital media is delivered to the client, the client first needs to get proper permission or entitlement before it can play or display the delivered content. In typical real-time digital media delivery systems such as cable television, the required ECMs are simultaneously delivered along with the digital media content. The CA server can be responsible for various CA-related tasks and it provides necessary support to the authenticated client for accessing digital media content which the client is entitled to. The client can play the media in real time and/or store it for later viewing. The figure shows a storage unit 112D within the DRM realm associated with the client, which DRM realm is the second DRM domain provided by the CA/DRM protection device 115C. The storage unit 112D may be a part of the client device STB 112. The digital media is typically stored in the storage unit in an encrypted/scrambled form, or in an otherwise protected form. In order for a client device to have access to the content of the stored media, it needs to have proper permission, which is provided by the DRM system in case the client is legitimately entitled to certain operations (e.g. viewing) on the digital media.

In exemplary embodiments, all or portions of the access application for each service provider of broadcast TV can be hosted on an on-line server. The other portions can be hosted on the access interface (such as the bridge), or the rendering device (such as the PC, thin client, TV, wireless phone, etc.). Further, the on-line application can contain multiple elements that can point to any application portions and content items on any combination of platforms. Further information about bridges between DRM domains is described in U.S. application Ser. No. 11/1446,427, filed Jun. 2, 2006 and U.S. application Ser. No. 11/823,194, filed Jun. 26, 2007, and both of these application are incorporated herein by reference.

In an embodiment, the service provider can employ the same pay TV service access applications (such as VOD, PPV, or Guide) regardless of interactive client device (such as Windows, or MAC). The home page of the service is platform-independent and hosts the high level service access session management (such as the VOD, PPV and Guide applications) using standard web protocols.

In another embodiment, the service provider can employ a unique guide and Switched Digital (SD)/VOD application and a specific choice of DRM for access of its services on a PC or other client system such as the system 112. For example, the home page of the service, the PPV application, and the customized guide can be hosted on-line. Alternatively, live and SD/VOD content is sourced from the access interface, and a generic DVR application and content and standards-based protected player are hosted on the PC or other client system such as the system 112.

Figure 15:
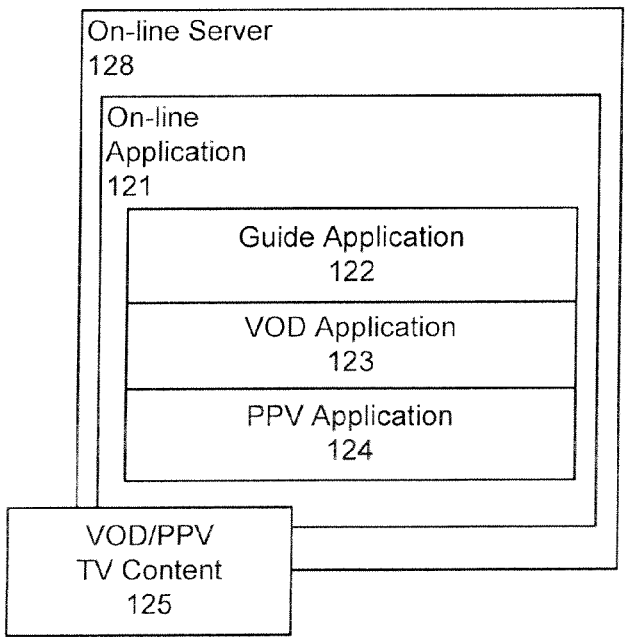
FIG. 15 illustrates an exemplary embodiment of an on-line server according to certain embodiments of the present invention.

FIG. 15 illustrates an exemplary on-line server 128, comprising an on-line application 121 with access to pay TV content 125 such as VOD, PPV or live TV content. The server 128 may be any one of the servers described herein which hosts an on-line application such as the on-line application 128A or 118A. In exemplary embodiments, certain TV content originates from the Internet and thus can be under control of an Internet server such as the on-line server 128. The on-line application 121 can include various TV services such as a guide application proving TV guide to the client, a VOD application or a PPV application. Other applications might also be included. These applications may be implemented as software which executes on the on-line server 128.

Figure 16:
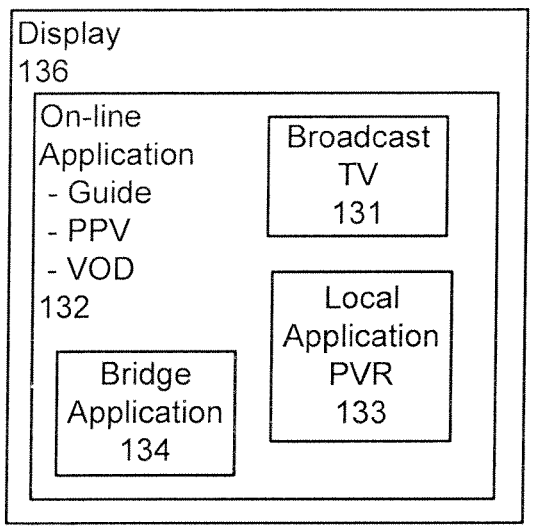
FIGS. 16-18 illustrate various navigation controls according to embodiments of the present invention.
Figure 17:
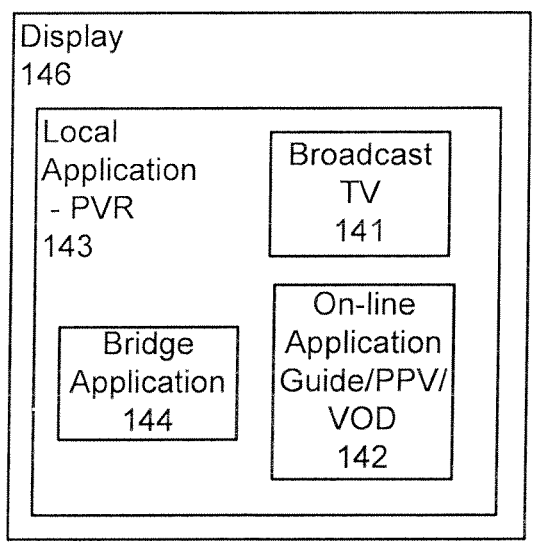
Figure 18:
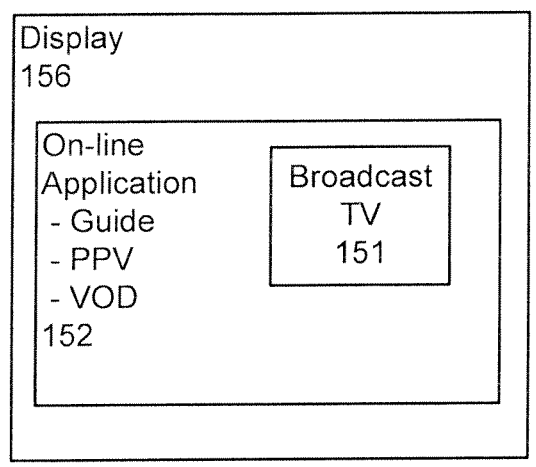

FIGS. 16-18 illustrate various navigation controls according to embodiments of the present invention. These navigation controls are typically presented on a display as a user interface for the user/view of the display, such as the displays 116, 126, 106, etc. in the embodiments described herein. FIG. 16 illustrates a display 136 showing a broadcast TV content 131, tuned to a desired channel from the broadcast signals. The user interface of the on-line application 132 can represent a main feature, including guide, PPV and VOD applications. A user interface of a bridge application 134 and a user interface of a local application 133 (such as a DVR controller for the player 112C, for example) are also presented on the display 136.

FIG. 17 illustrates a display 146 where the local application 143 may be the main control, with the broadcast TV content 141, the bridge application 144 and the on-line application 142 being secondary controls. FIG. 18 illustrates a simplified display 156 where only the user interface of the on-line application 152 is shown with the broadcast TV content 151. This display can be used when other applications are not needed, or when there is no bridge or local application, for example, when the computer is in roaming mode, away from the local STB.

In certain exemplary embodiments, the present on-line application provides an on-line advertisement management which comprises targeted advertisements determined through the user's interactive channel surfing and programming selection. The on-line application can comprise an on-line TV search engine and/or channel or program or movie guide which can facilitate the navigation of TV content. The on-line application can maintain an advertising profile for each viewer, which is determined in part by recording data about the navigating (e.g. channel surfing and program selection) of the content of the broadcast signals, and by recording a plurality of selections of the viewer transmitted to the on-line application.

Targeted advertising sends selected advertisements to targeted individuals with the selected advertisements chosen based on the profile of the targeted individuals. Targeted advertising can be more effective with selected individuals receiving the advertisements rather than indiscriminately broadcasting the advertisements to all clients. Targeted advertising historically has been based on geographic areas and directed to selected demographic sectors of the population.

The present advertisement management provides a methodology for sampling television-viewing habits of the viewers by collecting, assembling and maintaining an advertising profile based on the navigation and selections of broadcast signals. The advertising profile gives valuable information about the television viewing habits of a family of viewers, including the exact address and household details. The accuracy of the present advertising profile is much improved over the general mathematical model which only explains the general behavioral patterns of the population in television viewing.

The present advertising profile can accurately and automatically determine the personal preferences of a viewer, and thus advertisements based on profile advertising can be presented to the viewer with high degree of match for the personal TV viewing environment.

The on-line application first determines an advertisement profile for the user of the browser, and then substitutes or causes the substitution of the incoming advertising from the broadcast signals with advertisements selected based on the advertising profile. Alternatively, the client receives the broadcast signals from the network, and identifies the incoming advertising. For example, the Bridge can tag incoming advertising in real time by ad slot indexing. Based on the advertising profile, the profile advertisements are selected to substitute for the incoming advertising. For example, the PC or DVR Advertising Insertion Application substitutes the advertisements.

The profile advertisements can be recorded to a DVR (Digital Video Recorder) through the on-line application. For example, a Bridge Advertising Capture Application can capture advertisements, and cause the PC or the DVR to record them. Alternatively, the Advertisement Management Application can push advertisements to DVR via the Internet.

Figure 19:
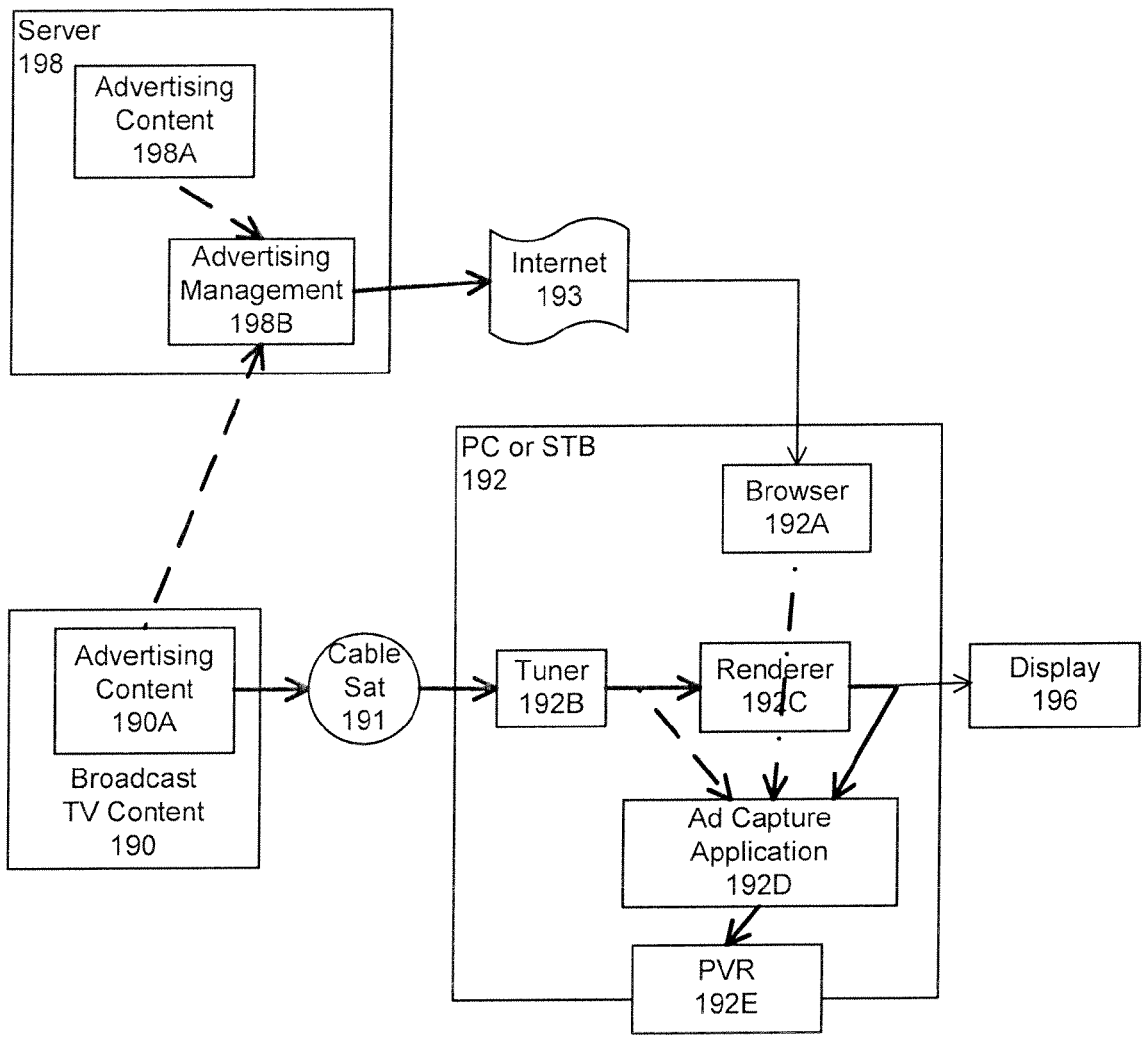
FIG. 19 illustrates the various processes of advertisements captured to a DVR for certain embodiments of targeted advertising.

FIG. 19 illustrates the various processes of advertisements captured to a DVR. The client receives broadcast signals 190 through a cable or satellite network 191, through a PC or STB 192 to the display 196. The PC or STB 192 communicates with an on-line application executing on a server 198 through a second network connection such as the Internet 193. The Advertising Management application 198B executing on the server 198 receives advertising content 198A from the Internet network or advertising content 190A from the broadcast signals 190, and transmits to the browser 192A through the Internet connection 193. Advertising contents 198A and 190A are selected based on advertising profile of the users determined from selections made by the users as they navigate through content presented by the on-line application. The browser 192A then provides the advertising contents to the Advertisement Capture Application 192D, which then causes the DVR to record the advertisements. Alternatively, advertising content 190A can be sent through the cable or satellite network 191, through the tuner 192B to the Advertisement Capture Application 192D. The advertising content 190A can also be rendered through the renderer 192C before reaching the Advertisement Capture Application 192D, which then causes the DVR to record the advertisements. The Advertisement Capture Application 192D can reside in a local application in the STB, or can be a bridge application in a bridge section.

The advertisement substitution can occur with the recorded advertisements, or can be provided directly from the on-line application pushing substituted advertisements through the Internet connection. An on-line Advertisement Management Application can instruct the Advertising Capture and Advertising Insertion applications on the capturing and insertion of profile advertisements onto the broadcast stream. The advertising insertion can happen either at capture, at playback, or at rendering time.

Figure 20:
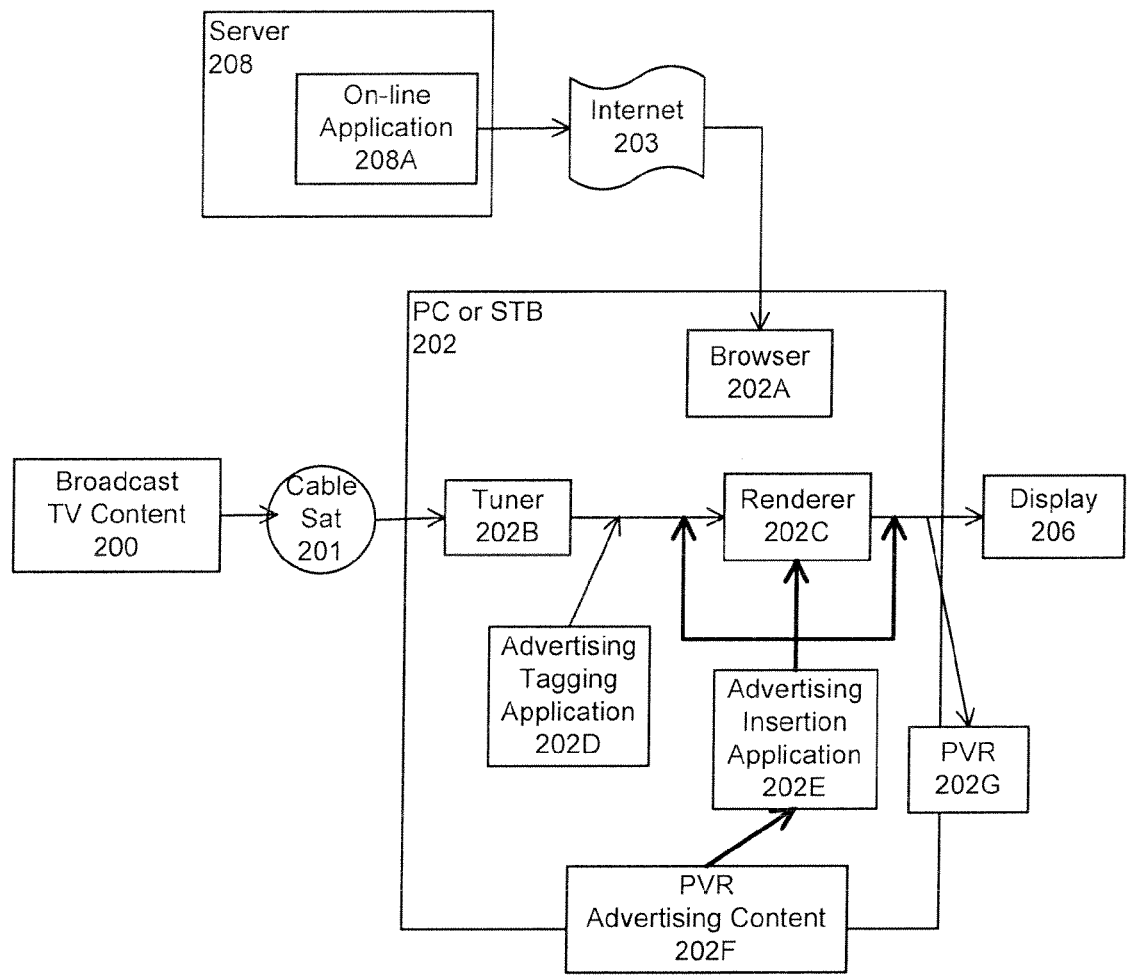
FIG. 20 illustrates an exemplary advertising substitution with the replacement advertisements retrieved from a DVR.

FIG. 20 illustrates an advertising substitution with the replacement advertisements retrieved from DVR. The client receives broadcast signals 200 through a cable or satellite network 201, through a PC or STB 202 to the display 206 through the tuner 202B and the renderer 202C. The PC or STB 202 communicates with an on-line application executing on a server 208 through a second network connection such as the Internet 203. An Advertising Tagging Application 202D tags incoming advertising in real time, for example through advertising slot indexing. An Advertising Insertion Application 202E substitutes advertisements at various stages of renderer 202C, either before, during or after. The substituted advertisements are retrieved from the Advertising Content stored in the DVR 202F. The broadcast content with the substituted advertisements can be sent to the display 206, or to be recorded to a DVR 202G for later viewing.

Figure 21:
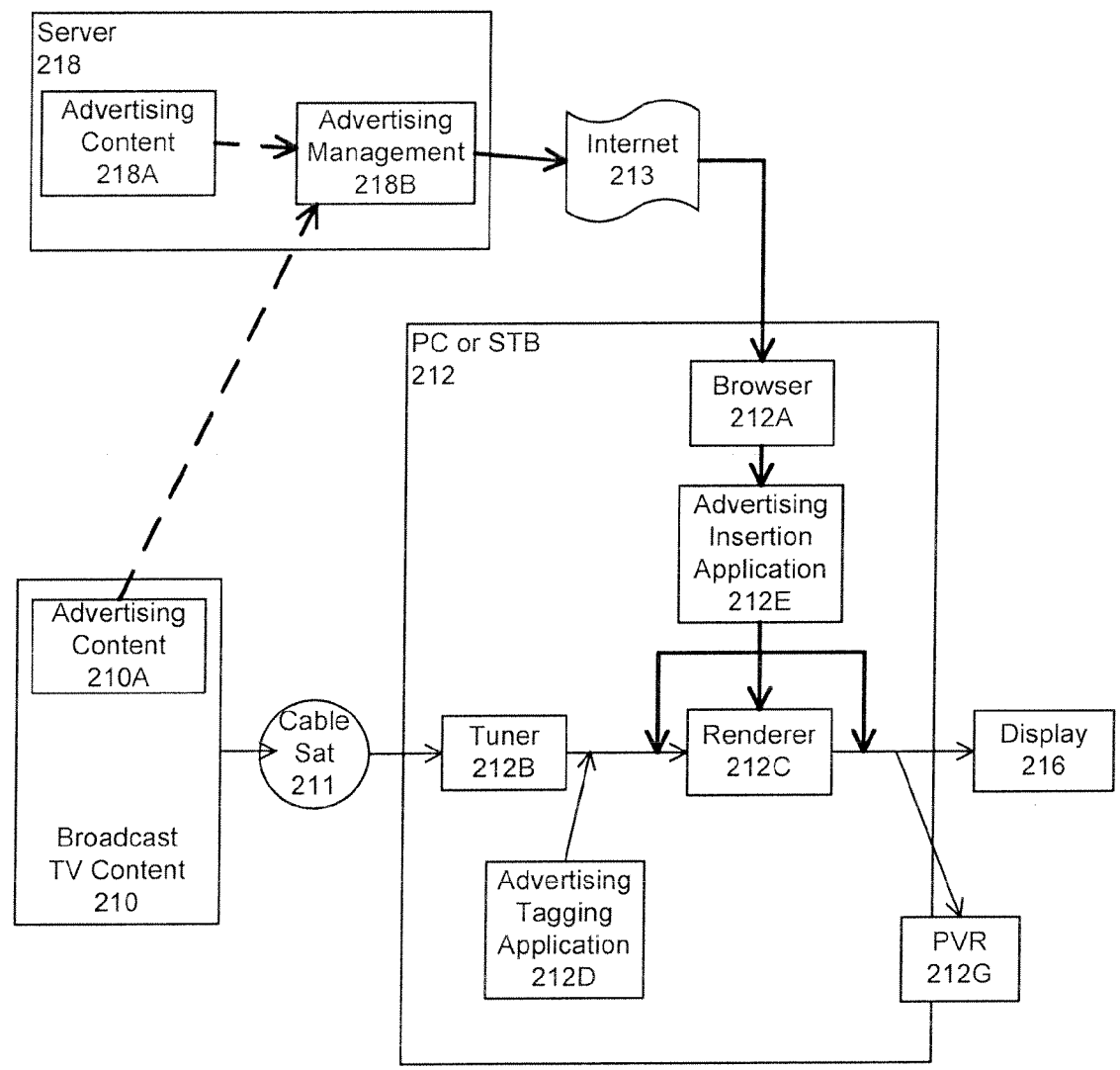
FIG. 21 illustrates an advertising substitution with the replacement advertisements pushed through the Internet by the on-line application.

FIG. 21 illustrates an advertising substitution with the replacement advertisements pushed through the Internet by the on-line application. The client receives broadcast signals 210 through a cable or satellite network 211, through a PC or STB 212 to the display 216 through the tuner 212B and the renderer 212C. The PC or STB 212 communicates with an on-line application executing on a server 218 through a second network connection such as the Internet 213. An Advertising Tagging Application 212D tags incoming advertising in real time, for example through advertising slot indexing. An Advertising Insertion Application 212E substitutes advertisements at various stages of renderer 212C, either before, during or after. The substituted advertisements are retrieved from the browser 212A, which are either the Advertising Content 210A from the broadcast signals 210, or the advertising content 218A from the Internet network. Advertisement Management 218B can push the advertising contents 210A or 218A through the Internet 213 to the browser 212A to provide to the Advertising Insertion Application 212E. The broadcast content with the substituted advertisements can be sent to the display 216, or to be recorded to a DVR 212G for later viewing.

Figure 22:
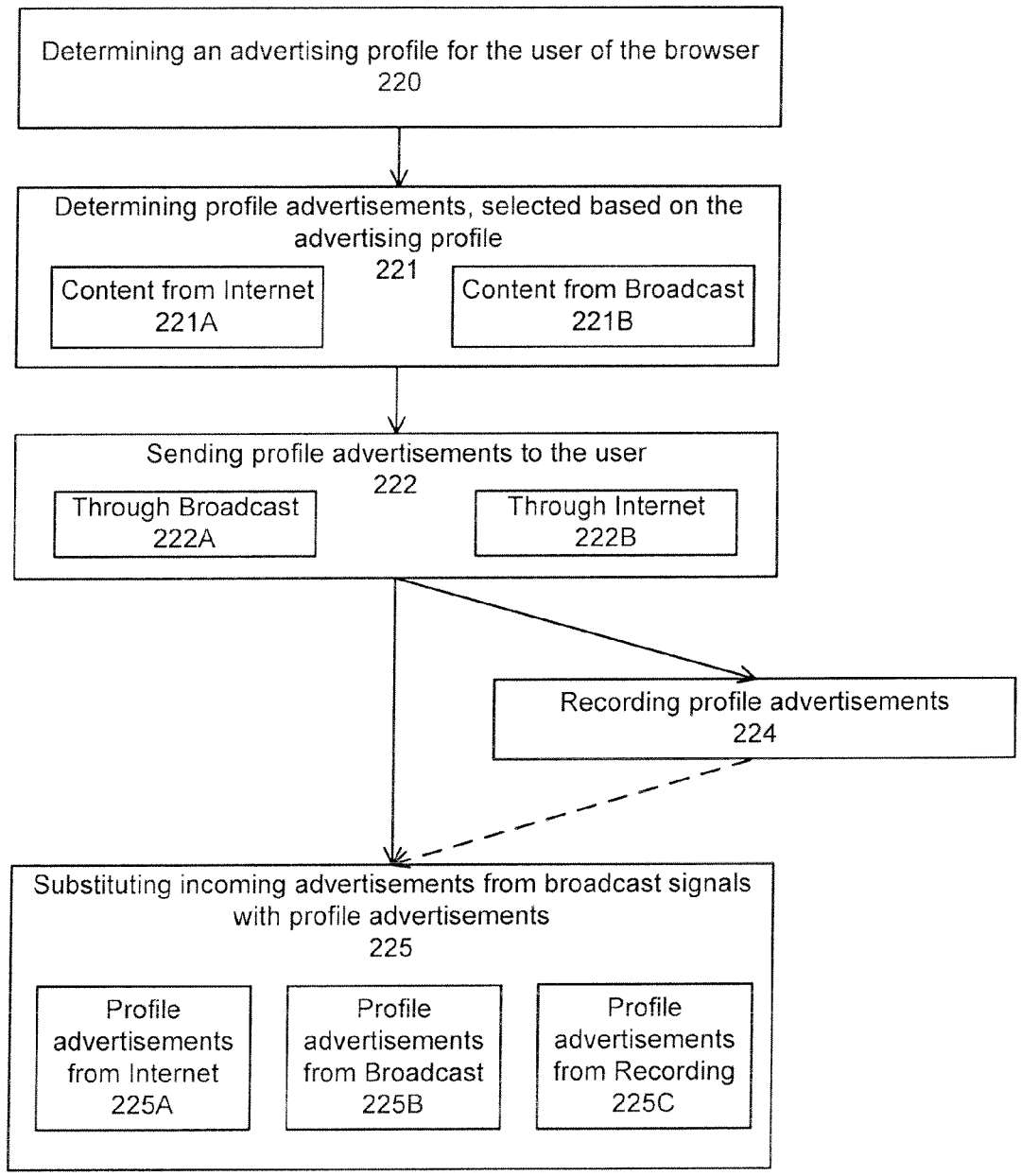
FIG. 22 illustrates an exemplary flowchart for advertising management according to certain embodiments of the present invention.

FIG. 22 illustrates an exemplary flowchart for advertising management according to certain embodiments of the present invention. Operation 220 determines an advertising profile for the user of the browser. The advertising profile is determined in part from the data collected as a user uses the on-line application to navigate the content of the broadcast signals recorded while the user is using the on-line application for surfing the broadcast signals, and otherwise using the on-line application. The advertising profile is also determined from the history of selections from the users of the household, which are transmitted by the browser to the on-line application. The advertising profile can also be determined through the demographic and geographic data of the user in establishing the Internet connection. Operation 221 determines the advertisements to be presented to the user, for substituting the incoming advertising. The substituted advertisements are selected based on the advertising profile, to ensure the right audience. The content of the substituted advertisements can be from the Internet (operation 221A), or from broadcast signals (operation 221B). Operation 222 sends the substituted advertisements, e.g. the advertisements based on the advertising profile, to the user. The substituted advertisements can be sent through broadcast network (operation 222A), or through Internet network (operation 222B). Operation 224 records the profile advertisements for later use. Operation 225 substitutes incoming advertising from broadcast signals with the profile advertisements. The profile advertisements can be sent from the Internet (operation 224A), from broadcast network (operation 224B), or from recording (operation 224C).

Figure 23:
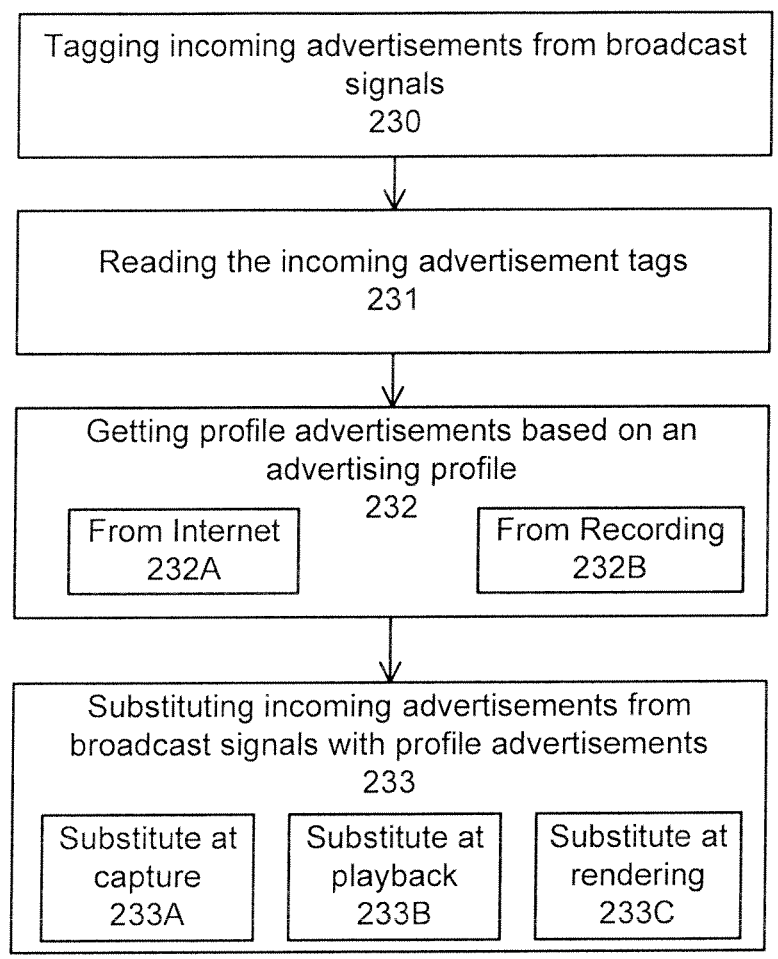
FIG. 23 illustrates another exemplary flowchart for advertising management according to certain embodiments of the present invention.

FIG. 23 illustrates another exemplary flowchart for advertising management according to certain embodiments of the present invention. Operation 230 tags the incoming advertising from the broadcast signals. Operation 231 reads the incoming advertising tags, for example, for determining the slot or the location of the advertisements. The tags may, for example, indicate the certain ads are for the general public and that other ads are not and can be substituted with ads based on the profile of the user. Operation 232 gets the substituted advertisements which are the advertisements selected based on the advertising profile of the user. The profile advertising can be retrieved from Internet network (operation 232A) or from recording (operation 232B). Operation 233 substitutes incoming advertising from broadcast signals with the profile advertisements. The profile advertisements can be sent from the Internet (operation 233A), from broadcast network (operation 233B), or from recording (operation 233C).

Figure 24:
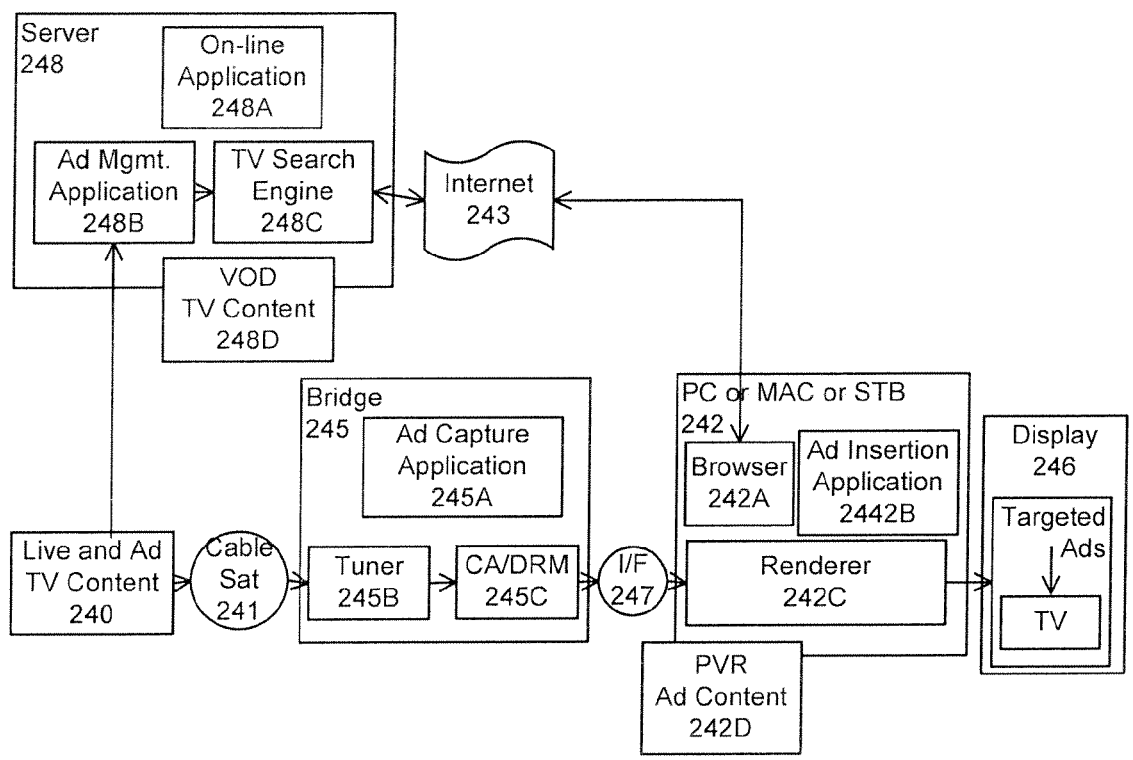
FIG. 24 illustrates another embodiment of advertising management according to certain embodiments of the present invention.

FIG. 24 illustrates another embodiment of advertising management according to certain embodiments of the present invention. The client receives broadcast signals 240 through a cable or satellite network 241, through a bridge 245 (passing through tuner 245B and CA/DRM protection 245C), to an interface 247, then to a PC or STB 242 (through the renderer 242C) and to the display 246. The PC or STB 242 communicates with an on-line application executing on a server 248 through a second network connection such as the Internet 243. The client can receive pay TV content such as VOD TV content 248D from the server across the Internet network. The Advertising Capture Application 245A within the Bridge 245 can capture the incoming advertising, sent globally from the broadcast signals 240, including live and advertising content. An Advertising Insertion Application 242B can substitute the incoming advertising with pre-recorded advertisements, preferably from the advertising content of the DVR 242D. The Advertising Insertion Application 242B can also substitute the incoming advertising with advertisements sent from the on-line application 248A. The substituted advertising content is selected based on an advertising profile of the user, and can be determined through a TV search engine 248C, an Advertising Management Application 248B, or an on-line application 248A from the server 248. Targeted advertising is then shown in the display 246.

Figure 25:
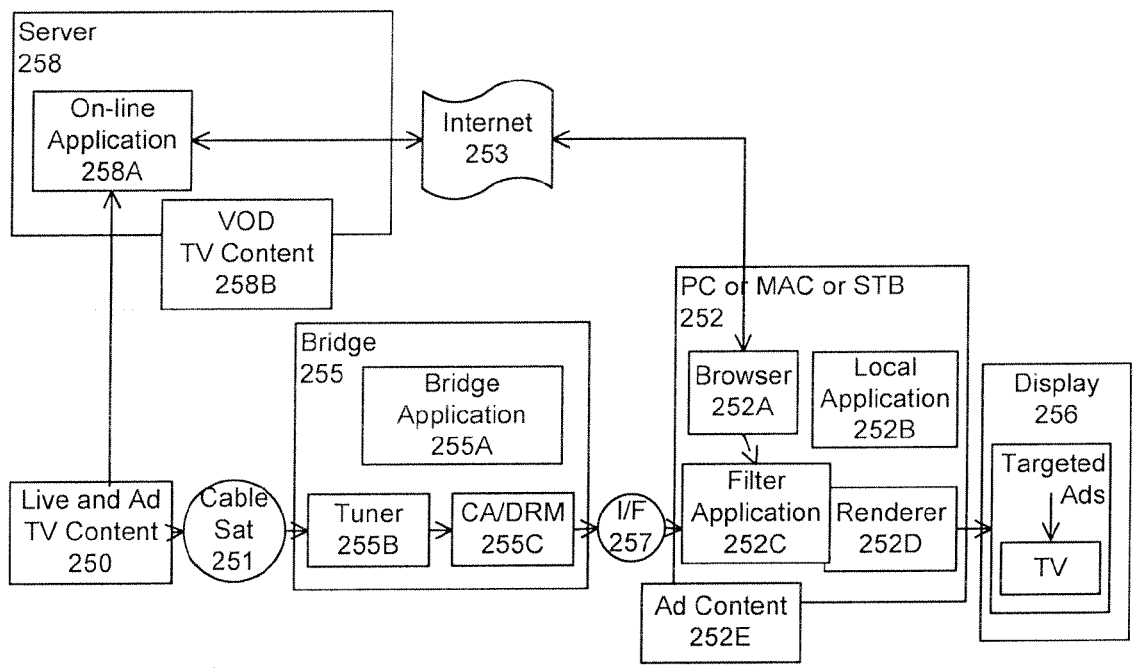
FIG. 25 illustrates another embodiment of advertising management according to certain embodiments of the present invention.

FIG. 25 illustrates another embodiment of advertising management according to certain embodiments of the present invention. The PC or STB client receives broadcast signals 250 through a cable or satellite network 251, through a bridge 255 (passing through tuner 255B and CA/DRM protection 255C), to an interface 257, then to a PC or STB 252 (through a Filter Application 252C and the renderer 252D) and to the display 256. The PC or STB 252 communicates with an on-line application executing on a server 258 through a second network connection such as the Internet 253. The client can receive pay TV content such as VOD TV content 258B from the server across the Internet network. The Filter Application 252C can read the content tags from the Bridge Application 255A, which has the capability to tag content including advertisements. The Filter Application may also track tuning commands from the PC to the bridge, and then substitute live advertisements with recorded profile-based advertisements, leaving the PC and the local application 252B unmodified. The Bridge Application and/or the Filter Application can be controlled by the on-line Application 258A. Targeted advertising is then shown in the display 256.

Figure 26:
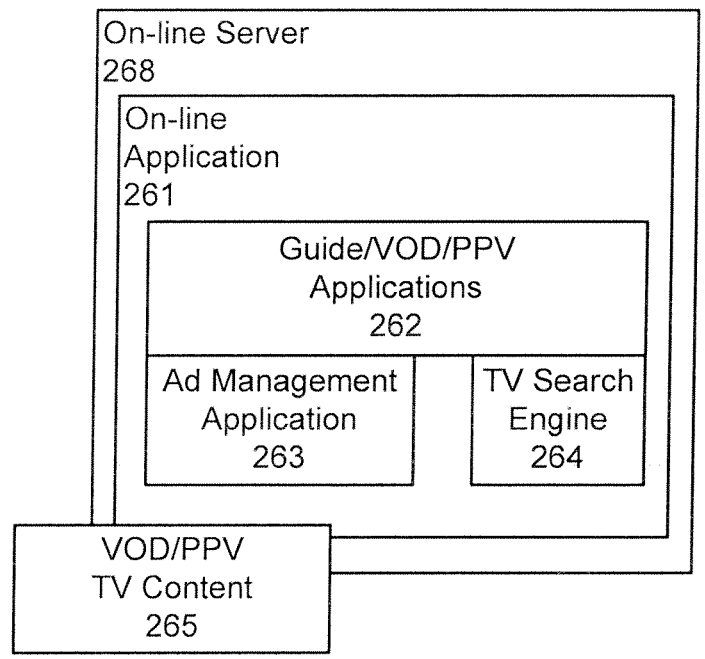
FIG. 26 illustrates an exemplary on-line server for targeted advertising according to an embodiment of the present invention.

FIG. 26 illustrates an exemplary on-line server 268 (which represents any one of the servers which include Ad management applications, such as server 24B), comprising an on-line application 261 with access to pay TV content 265 such as VOD, PPV or live TV content, preferably through the appropriate applications such as guide/VOD/PPV applications 262. An Advertisement Management Application 263 can be presented and controlled by the on-line application, together with a TV search engine 264 for locating information.

Figure 27:
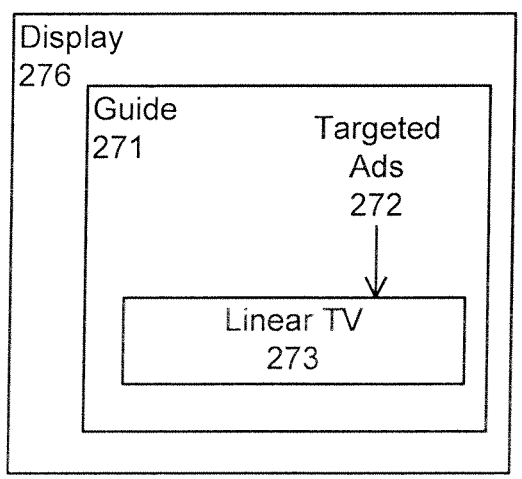
FIG. 27 illustrates a display for targeted advertising according to an embodiment of the present invention.

FIG. 27 illustrates a display 276 (which may represent any one of displays 196, 206, 216, 246, and 256) showing TV content 273, tuned to a desired channel from the broadcast signals, together with a guide application 271. Targeted advertisements 272 has substituted incoming advertising within the TV content 273.

In certain exemplary embodiments, the present on-line application provides roaming capability for navigating broadcast signals from a roaming client system which is associated with a first client system which also can be connected to the server. With the on-line application residing remotely, such as in a server connected to the Internet, a roaming computer or other consumer electronic device can be linked to the Internet and navigate the on-line application using the browser of the roaming computer or other consumer electronic device. Seamless operations can be achieved with pertinent data parameters stored in the server. The roaming computer or other consumer electronic device can be linked to the first client system by a local network, such as in a location across the room of the television display. The roaming computer can be linked to the first client system across town, or across country, and still be connected and controlling the navigating broadcast signals. The connection can be wired or wireless connection. Furthermore, the on-line application can accommodate effective roaming for protective TV content if portions of the access application are hosted on-line.

With the Internet connection with the on-line application, a roaming computer or other consumer electronic device can navigate the broadcast signals as effective as from the local PC or STB, such as the system 242 or the system 122, which acts as a first client system. The roaming capability allows navigating of the broadcast signals such as searching for content or schedule of desired programs as if the roaming computer or device were the first client system. Further, the roaming capability can allow remote operation of the first client system, such as recording a program or schedule a recording session to the local DVR.

In exemplary embodiments, broadcast signals can be retransmitted from the client site (e.g. the first client system) to the roaming computer or other consumer electronic device, in response to the commands from the roaming computer or other consumer electronic device. The broadcast signals can be sent directly to the roaming computer or other consumer electronic device through a cable or the Internet or a separate network such as a local network. The broadcast signals are preferably sent through the Internet, using the same connection as the navigating commands. The broadcast signals can be sent after being rendered, thus directly to the remote display. The broadcast signals can be sent before being rendered, thus using the renderer of the roaming computer or other consumer electronic device for rendering. The broadcast signals can be sent to the roaming computer or other consumer electronic device for viewing or for recording. Alternatively, the roaming computer or other consumer electronic device can be connected to another source of broadcast signals, such as another cable or satellite network connection. Thus a roaming computer or other consumer electronic device can be connected to an Internet and a broadcast networks, and navigating the broadcast signals with the on-line Internet application as if it were the first client system.

In exemplary embodiments, the content of the broadcast signals are protected, for example, by a DRM or CA protection. The access application can be fully or partly hosted on the on-line server, thus the roaming computer or other consumer electronic device can navigate the broadcast signals after validating with the on-line access application.

Figure 28:
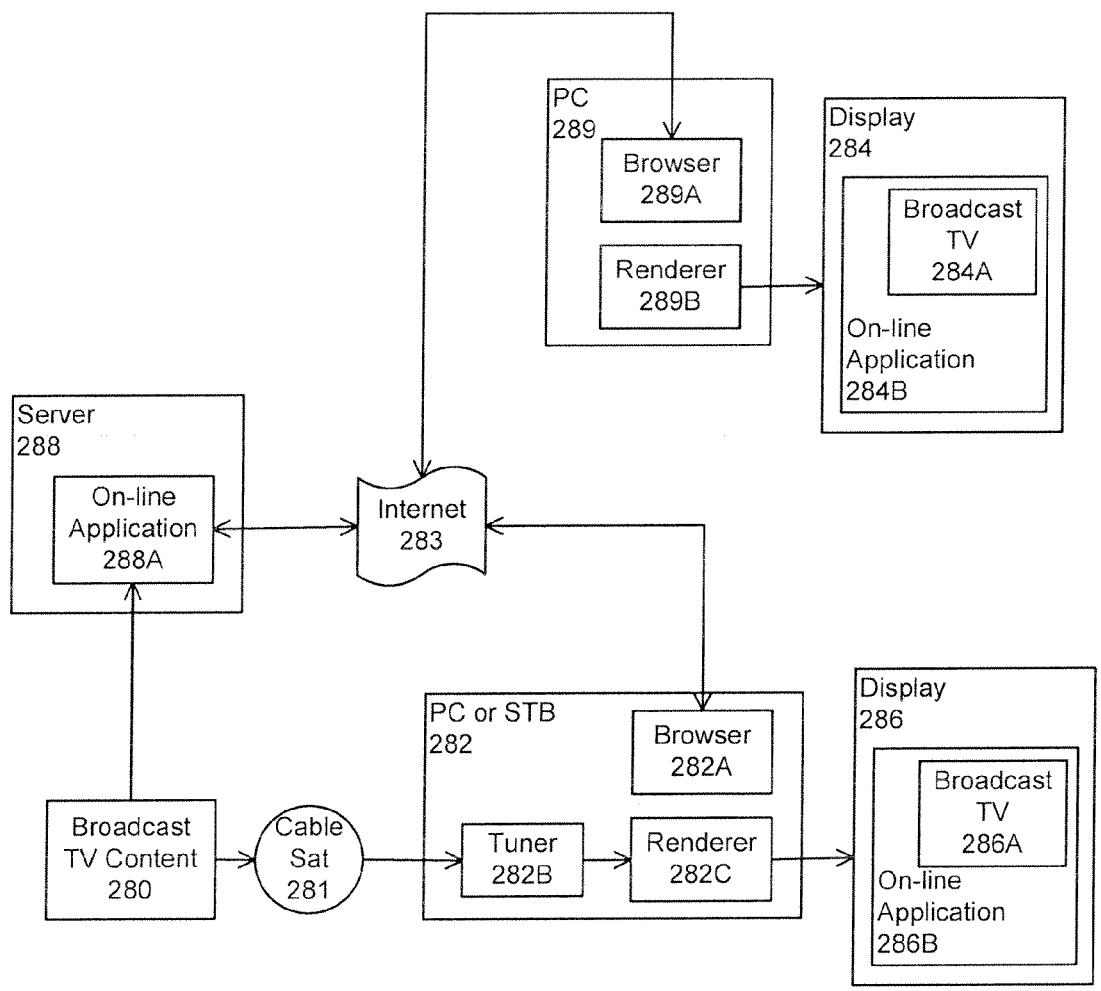
FIG. 28 illustrates an exemplary embodiment of a roaming configuration according to at least certain embodiments of the present invention.

FIG. 28 illustrates an exemplary embodiment of a roaming configuration according to an embodiment of the present invention. The local or first client system receives broadcast signals 280 through a cable or satellite network 281, to a PC or STB or other system 282 (through tuner 282B and renderer 282C) and to the display 286, displaying broadcast TV content 286A and optional on-line application screen 286B. The PC or STB 282, which is the first client system, communicates with an on-line application 288A executing on a server 288 by a browser 282A through a second network connection such as the Internet 283. A roaming PC or other consumer electronic device 289 can be connected to the Internet network 283 and communicates with the on-line application 288A through a browser 289A of the roaming computer or other consumer electronic device 289. After verification by the server that PC 282 and PC 289 belong to same domain, live and recorded content of PC 282 can be displayed on the display 284 of the remote computer, including broadcast TV content 284A and optional on-line application screen 284B through optional renderer 289C. The roaming computer or other consumer electronic device 289 can, with access to the on-line application, virtually browse recorded content of PC 282, and therefore accessing the live and recorded broadcast signals is not limited to a home which is typically where the first client system will be situated.

The configuration shown discloses an Internet connection for the roaming computer or other consumer electronic device, but in general, any other network connection is possible, as long as the roaming computer or other consumer electronic device can communicate with the on-line application.

Figure 29:
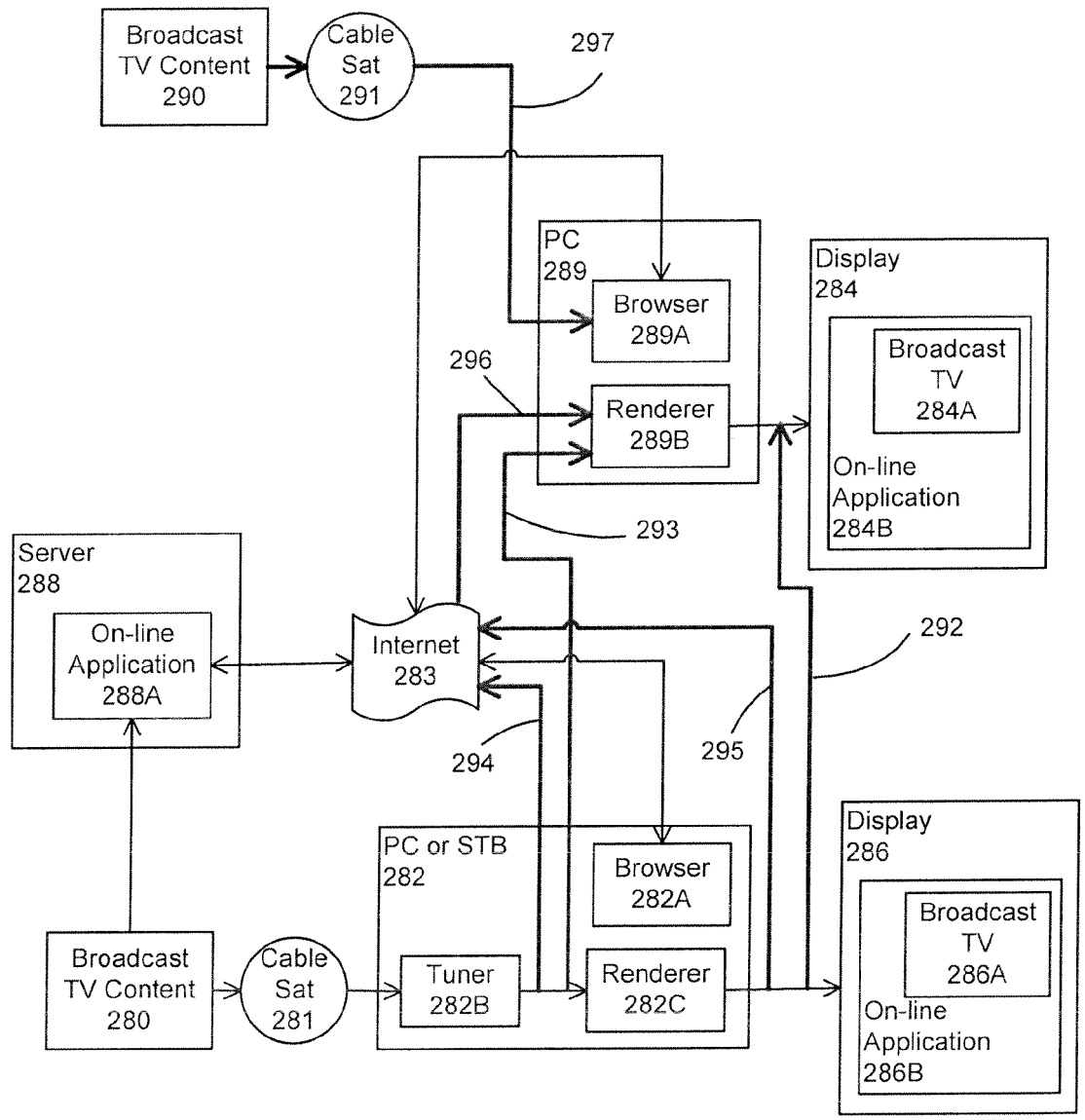
FIG. 29 illustrates various data paths for at least certain embodiments of the roaming configuration.

The control path for the roaming system can be accomplished with an Internet network connection. For the data path, the connection can be through a local network, the Interet network, or a separate cable/satellite network. FIG. 29 illustrates various data paths for various roaming configurations. Data path 293 provides TV content from tuner 282B of the client to the renderer 289C of the remote computer, redirecting the TV content to the remote computer through a local connection, such as direct wiring or a local network (such as within a home). An alternative data path 292 can capture rendered content, further encode it according to the appropriate channel requirements, and protect it according to the applicable rules for transmission via Internet at 295. Data paths 294 provides TV content from the tuner 282B of the client to the Internet network, and redirect 296 from the Internet to the renderer 289C of the remote computer. Alternatively, the remote computer can be connected to broadcast signals 290 through a cable or satellite network 291 through a connection 297. The roaming computer or other consumer electronic device might include a tuner for tuning the broadcast signals.

Figure 30:
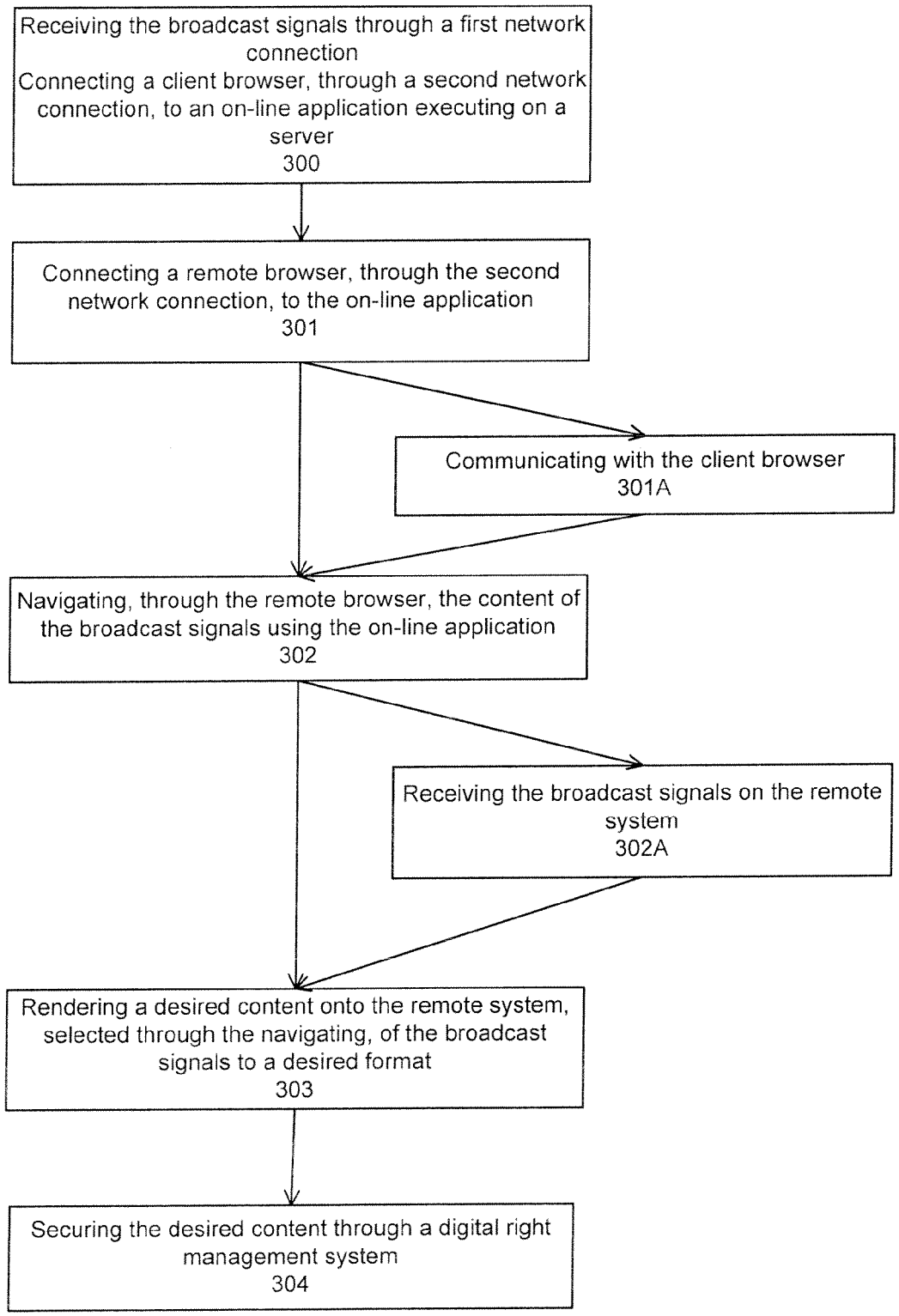
FIG. 30 illustrates an exemplary flowchart for a roaming configuration according to at least certain embodiments of the present invention.

FIG. 30 illustrates an exemplary flowchart for a roaming configuration according to the present invention. Operation 300 provides that a client system is receiving broadcast signals through a network connection, such as a cable or satellite network. The client system further comprises a client browser which is connected to an on-line application executing on a server, through a second network connection, for navigating the broadcast signals. Operation 301 connects a remote browser (on for example a roaming system such as a roaming computer or other consumer electronic device) to the on-line application through the second network connection. The remote browser may be also referred to as a roaming browser. The remote browser can optionally communicate with the client system, such as the client browser, preferably through the second network connection (operation 301A). Operation 302 navigates the content of the broadcast live and recorded signals through the remote browser using the on-line application. Upon validation by the on-line application that the remote and client devices belongs to the same home domain, the content available to the first client system can be made available to the roaming system, either through the second network connection, or through another network connection for broadcast signals (operation 302A). Operation 303 renders a desired content to a desired format onto the remote system. The desired content is selected from the navigating process which can be performed on the roaming system. The desired content can be from the broadcast signals or from the server. Operation 304 provides optional content protection of the desired content through a digital right management system. In this context the purpose of the digital rights management system is to provide granular and deterministic access rules for consumption of the content in the home domain. The definition of the scope of the home domain is managed by the on-line application. The server can aggregate the appropriate content keys and rights so that they can be redistributed to any remote or roaming client system on-demand after validation.

Figure 31:
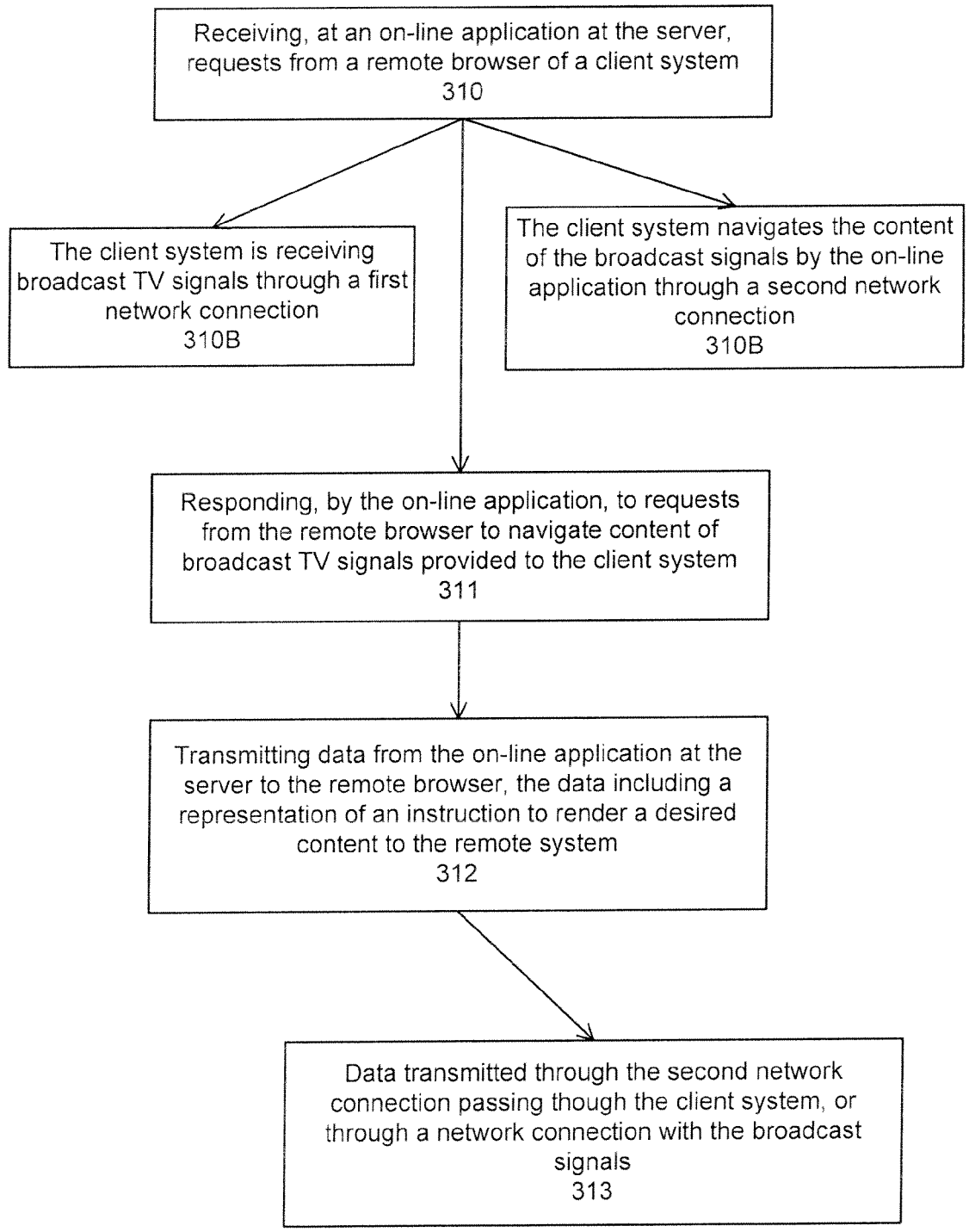
FIG. 31 illustrates another exemplary flowchart for a roaming configuration according to at least certain embodiments of the present invention.

FIG. 31 illustrates another exemplary flowchart for a roaming configuration according to the present invention. Operation 310 receives requests from a remote browser of a client system at an on-line application. The on-line application executes on a server, connected to the remote browser through a second network connection such as the Internet. The client system is already connected to a source of broadcast signals through a first network connection such as cable or satellite (operation 310A). The client system further provides navigation of the content of the broadcast signals through the second network connection by the on-line application (operation 310B). Operation 311 ensures that the on-line application securely provides to the remote PC the same live and recorded content for navigation, as the one available on the original PC. Operation 312 transmits data from the on-line application at the server to the remote browser. The data includes representation of an instruction to render a desired content to the remote system. The content transmitted to the remote system can be through the second network connection, already copied on the remote control but not enabled until the on-line application is called, or through an additional connection with the broadcast signals (operation 313).

What is claimed is:

1. A method for processing broadcast signals at a bridge, the method comprising:

receiving, at the bridge, the broadcast signals through a first network connection, wherein the bridge has a tuner, which is coupled to receive the broadcast signals, the first network connection receives an input of content associated with a first digital rights management (DRM) system, and wherein the bridge has a second network connection which provides an output of content associated with a second digital rights management (DRM) system, and wherein the bridge acts as an interface between the first DRM and the second DRM;

wherein the second network connection provides a connection for a non-broadcast enabled client, wherein the non-broadcast enabled client is compatible with the second DRM system but not compatible with the first DRM system, and wherein the non-broadcast enabled client includes a browser that connects to an on-line navigation application through the second network connection; receiving, at the bridge, a command, from the browser to select a desired content of the broadcast signals, the command resulting from a navigation, by the browser, of the on-line navigation application;

sending, in response to the command, from the bridge to the non-broadcast enabled client, the desired content after the desired content has been received by the tuner through the first network connection, wherein the desired content is decrypted according to the first DRM system and re-encrypted with the second DRM system.

2. A method as in claim 1 wherein the on-line application is selected, by the browser, from a group of on-line applications comprising at least one of a guide application, a Live content application, a VOD (Video on Demand) application, and a PPV (Pay Per View) application.

3. A method as in claim 1 wherein the broadcast signals comprise at least one of broadcast TV content, guide TV service, VOD pay service, PPV pay service, Switched Digital service, and live content and wherein the method further comprising:

tuning, in a tuner in the bridge which is coupled to the browser, to the desired content by tuning to at least one frequency of signals to detect and receive the desired content in one channel from the broadcast signals which also comprise other frequencies of other signals in other channels.

4. A method at a server for navigating broadcast signals, comprising:

receiving, at an on-line application at the server, requests from a browser at a non-broadcast enabled client system;

responding, by the on-line application, to requests from the browser to navigate a content of broadcast TV signals provided through a first network connection to a bridge, wherein the bridge has a tuner, which is coupled to receive the broadcast signals, wherein the first network connection receives an input of content associated with a first digital rights management (DRM) system, and wherein the bridge has a second network connection which provides an output of content associated with a second digital rights management (DRM) system, and wherein the bridge acts as an interface between the first DRM and the second DRM, wherein the second network connection provides a connection for the non-broadcast enabled client system, wherein the non-broadcast enabled client system is compatible with the second DRM system but not compatible with the first DRM system, the on-line application being connected to the browser through the second network connection;

transmitting data from the on-line application at the server to the browser, the data including a representation of an instruction to tune the tuner at the bridge to select a desired content of the broadcast signals, the representation of the instruction resulting from a navigation, by the browser, of the on-line navigation application, wherein the desired content is decrypted at the bridge according to the first DRM system and re-encrypted at the bridge with the second DRM system.

5. The method as in claim 4 wherein the on-line application is at least one of a guide application, a live content application, a VOD application, and a PPV application.

6. A method as in claim 5 wherein the broadcast TV signals comprise at least one of broadcast TV content, guide TV service, VOD service, PPV service, and live content.

7. A method as in claim 5 wherein the instructions specify a channel to tune to which in turn specifies at least one frequency of signals to detect and receive the at least one channel from the broadcast TV signals which also comprise other frequencies of other signals in other channels.

8. A method as in claim 5, wherein the server is coupled to a source of the broadcast TV signals and provides data, to the source, about user selections made through the browser.

9. A method as in claim 5 wherein the on-line application is configured to accept the requests which specify a URL (Uniform Resource Locator), and wherein the first network connection connects the client system to at least one of a cable TV network and a Satellite TV network.

10. A system for navigating broadcast signals, comprising:
a bridge having a tuner, which is coupled to receive the broadcast signals through a first network connection, wherein the first network connection receives an input of content associated with a first digital rights management (DRM) system, and a second network connection which provides an output of content associated with a second digital rights management (DRM) system, and wherein the bridge acts as an interface between the first DRM and the second DRM;
a browser executing on a non-broadcast enabled client system which is connected to an on-line application through the second network connection, wherein the non-broadcast enabled client is compatible with the second DRM system but not compatible with the first DRM system, wherein the browser is configured to navigate a content of broadcast signals using the on-line application and wherein the browser is configured to send a command to the bridge to select a desired content of the broadcast signals by the tuner, the command resulting from a navigation, by the browser, of the on-line navigation application;
wherein the tuner in the bridge is configured to receive the broadcast signals via the first network connection, to select the navigated broadcast signal content, wherein the bridge sends, in response to the command, the desired content to the non-broadcast enabled client after the desired content has been received by the tuner through the first interface connection, wherein the desired content is decrypted according to the first DRM system and re-encrypted with the second DRM.

11. A system as in claim 10 wherein the system comprises a Digital Video Recorder and the renderer has a port to couple to a display.

12. A system as in claim 10 wherein the on-line application comprises at least one of guide application, Live content application, VOD application, and PPV application and wherein the tuner tunes to at least one frequency of signals to detect and receive the navigated broadcast signal content.

13. A system as in claim 10 further comprising a plug-in for communicating with specific hardware in the system.

14. A system as in claim 10 wherein the DRM of the first network connection is associated with a first DRM domain and the DRM of the browser's player is associated with a second DRM domain.

15. A non-transitory machine readable medium containing executable computer program instructions which when executed cause a machine to perform a method for navigating broadcast signals, the method comprising:
receiving, at an on-line application at the server, requests from a browser at a non-broadcast enabled client system;
responding, by the on-line application, to requests from the browser to navigate a content of broadcast TV signals provided through a first network connection to a bridge, wherein the bridge has a tuner, which is coupled to receive the broadcast signals, wherein the first network connection receives an input of content associated with a first digital rights management (DRM) system, and wherein the bridge has a second network connection which provides an output of content associated with a second digital rights management (DRM) system, and wherein the bridge acts as an interface between the first DRM and the second DRM, wherein the non-broadcast enabled client is connected to the second network connection, wherein the non-broadcast enabled client is compatible with the second DRM system but not compatible with the first DRM system, the on-line application being connected to the browser through the second network connection;
transmitting data from the on-line application at the server to the browser, the data including a representation of an instruction to tune the tuner at the bridge to select a desired content of the broadcast signals, the representation of the instruction resulting from a navigation, by the browser, of the on-line navigation application, wherein the desired content is decrypted at the bridge according to the first DRM system and re-encrypted at the bridge with the second DRM system.

16. The medium as in claim 15 wherein the on-line application is at least one of a guide application, a live content application, a VOD application, and a PPV application.

17. A medium as in claim 16 wherein the broadcast TV signals comprise at least one of broadcast TV content, guide TV service, VOD service, PPV service, and live content.

18. A medium as in claim 16 wherein the instructions specify a channel to tune to which in turn specifies at least one frequency of signals to detect and receive the at least one channel from the broadcast TV signals which also comprise other frequencies of other signals in other channels.

19. A medium as in claim 15, wherein the server is coupled to a source of the broadcast TV signals and provides data, to the source, about user selections made through the browser, and wherein the on-line application is configured to accept the requests which specify a URL (Uniform Resource Locator), and wherein the first network connection connects the client system to at least one of a cable TV network and a Satellite TV network.

20. A non-transitory machine readable medium containing executable computer program instructions which when executed, cause a machine to perform a method for processing broadcast signals at a bridge, the method comprising:

receiving, at the bridge, the broadcast signals through a first network connection wherein the bridge has a tuner, which is coupled to receive the broadcast signals, the first network connection receives an input of content associated with a first digital rights management (DRM) system, and wherein the bridge has a second network connection which provides an output of content associated with a second digital rights management (DRM) system, and wherein the bridge acts as an interface between the first DRM and the second DRM;

wherein the second network connection provides a connection for a non-broadcast enabled client is connected to the second network connection, wherein the non-broadcast enabled client is compatible with the second DRM system but not compatible with the first DRM system, and wherein the non-broadcast enabled client includes a browser that connects to an on-line navigation application through the second network connection;

receiving, at the bridge, a command from the browser to select a desired content of the broadcast signals, the command resulting from a navigation, by the browser, of the on-line navigation application;

sending, in response to the command, from the bridge to the non-broadcast enabled client, the desired content after the desired content has been received by the tuner through the first network connection, wherein the desired content is decrypted according to the first DRM system and re-encrypted with the second DRM system.

21. A medium as in claim 20 further comprising a local application for navigating the content of the broadcast signals.

22. A medium as in claim 20 wherein the bridge comprises a bridge application for securing the content of the broadcast signals between a first DRM domain and a second DRM domain.

23. A medium as in claim 20 further comprising a plug-in software for communicating with specific hardware.

* * * * *